(12) United States Patent
Brashers et al.

(10) Patent No.: US 8,086,585 B1
(45) Date of Patent: Dec. 27, 2011

(54) ACCESS CONTROL TO BLOCK STORAGE DEVICES FOR A SHARED DISK BASED FILE SYSTEM

(75) Inventors: Per Brashers, Oakland, CA (US); Sorin Faibish, Newton, MA (US); Jason Glasgow, Newton, MA (US); Xiaoye Jiang, Shrewsbury, MA (US); Mario Wurzl, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 509 days.

(21) Appl. No.: 12/242,618

(22) Filed: Sep. 30, 2008

(51) Int. Cl.
*G06F 17/30* (2006.01)
(52) U.S. Cl. .................................................. 707/705
(58) Field of Classification Search .................. 707/704, 707/783, 705, 781; 709/229
See application file for complete search history.

(56) References Cited

U.S. PATENT DOCUMENTS

| | | | |
|---|---|---|---|
| 5,253,203 A | 10/1993 | Partovi et al. | |
| 5,319,760 A | 6/1994 | Mason et al. | |
| 5,893,140 A | 4/1999 | Vahalia et al. | |
| 6,044,468 A | 3/2000 | Osmond | |
| 6,209,059 B1 | 3/2001 | Ofer et al. | |
| 6,324,581 B1 | 11/2001 | Xu et al. | |
| 6,477,544 B1 | 11/2002 | Bolosky et al. | |
| 6,493,825 B1 | 12/2002 | Blumenau et al. | |
| 6,658,522 B1 | 12/2003 | Martin et al. | |
| 6,842,810 B1 | 1/2005 | Fitzgerald et al. | |
| 6,868,516 B1 | 3/2005 | Walton et al. | |
| 6,973,455 B1 | 12/2005 | Vahalia et al. | |
| 6,976,165 B1 | 12/2005 | Carpentier et al. | |
| 7,093,021 B2 | 8/2006 | Blumenau et al. | |
| 7,165,152 B2 | 1/2007 | Blumenau et al. | |
| 7,206,863 B1 | 4/2007 | Oliveira et al. | |
| 7,260,636 B2 | 8/2007 | Blumenau et al. | |
| 7,263,590 B1 | 8/2007 | Todd et al. | |
| 7,458,102 B2 | 11/2008 | Rogers et al. | |
| 7,475,124 B2 | 1/2009 | Jiang et al. | |
| 2002/0078239 A1* | 6/2002 | Howard et al. ............... 709/245 |
| 2003/0229690 A1* | 12/2003 | Kitani et al. ................. 709/223 |
| 2004/0054750 A1* | 3/2004 | de Jong et al. ............... 709/217 |
| 2007/0055702 A1 | 3/2007 | Fridella et al. | |
| 2007/0088702 A1 | 4/2007 | Fridella et al. | |
| 2007/0260842 A1 | 11/2007 | Faibish et al. | |

(Continued)

OTHER PUBLICATIONS

Vahalia, Uresh, Unix Internals: The New Frontiers, 1996, p. 261-289 and 338-371, Prentice-Hall, Inc., Upper Saddle River, NJ.

(Continued)

*Primary Examiner* — Thu-Nguyet Le
(74) *Attorney, Agent, or Firm* — Richard Auchterlonie; Novak Druce & Quigg, LLP

(57) ABSTRACT

For enhanced access control, a client includes a token in each read or write command sent to a block storage device. The block storage device evaluates the token to determine whether or not read or write access is permitted at a specified logical block address. For example, the token is included in the logical block address field of a SCSI read or write command. The client may compute the token as a function of the logical block address of a data block to be accessed, or a metadata server may include the token in each block address of each extent reported to the client in response to a metadata request. For enhanced security, the token also is a function of a client identifier, a logical unit number, and access rights of the client to a particular extent of file system data blocks.

3 Claims, 18 Drawing Sheets

U.S. PATENT DOCUMENTS

2008/0005468 A1  1/2008  Faibish et al.

OTHER PUBLICATIONS

Nowicki, Bill, Network Working Group, RFC 1094, "NFS: Network File System Protocol Specification," Mar. 1989, 27 pages, Sun Microsystems, Inc., Santa Clara, CA.

NFS Protocol Sequence Diagram, Aug. 11, 2007, 3 pages, EventHelix.com Inc., Gaithersburg, MD.

Leach, Paul, and Naik, Dilip, "A Common Internet File System," Dec. 19, 1997, 121 pages, Microsoft Corporation, Redmond, WA.

Satran et al., "Internet Small Computer Systems Interface (iSCSI)," Network Working Group, Request for Comments: 3720, Apr. 2004, 257 pages, The Internet Society, Reston, VA.

"SCSI Read Commands," Wikipedia, printed Jun. 30, 2008, 3 pages, Wikimedia Foundation Inc., San Francisco, CA.

"EMC Symmetrix DMX Architecture," Product Description Guide, Mar. 2004, 76 pages, EMC Corporation, Hopkinton, MA.

"Enginuity: The Symmetrix Storage Operating Environment," EMC White Paper, Jul. 2005, 22 pages, EMC Corporation, Hopkinton, MA.

"EMC CLARiiON CX3 Best Practices for Achieving 'Five 9s' Availability," Feb. 2007, 14 pages, EMC Corporation, Hopkinton, MA.

Deploying Celerra MPFSi in High-Performance Computing Environments, Jun. 2006, 19 pages, EMC Corporation, Hopkinton, MA.

EMC Celerra iSCSI Solutions Microsoft Exchange 2003 Best Practices, Sep. 2005, 11 pages, EMC Corporation, Hopkinton, MA.

EMC Celerra File Mover, Datasheet, Sep. 2004, 2 pages, EMC Corporation, Hopkinton, MA.

"Celerra Data Migration Service (CDMS)," White Paper, Jan. 2002, 14 pages, EMC Corporation, Hopkinton, MA.

Black et al., "pNFS Block/Volume Layout," ietf.org Internet draft, Mar. 4, 2007, 18 pages, The Internet Society, Reston, VA.

Black et al., "pNFS Block/Volume Layout," ietf.org Internet draft, Dec. 30, 2005, 22 pages, The Internet Society, Reston, VA.

EMC Celerra HighRoad, Jan. 2002, 13 pages, EMC Corporation, Hopkinton, MA.

Fridella et al., "Elements of a Scalable Network File System Protocol," NEPS Workshop at the University of Michigan, Ann Arbor, MI, Dec. 4, 2003, position paper (5 pages) and presentation ("Building a Scalable NFS," 13 pages), EMC Corporation, Hopkinton, MA.

Menon et al., "IBM Storage Tank—a heterogeneous scalable SAN file system," IBM Systems Journal, vol. 42, No. 2, 2003, pp. 250-267, IBM Corp., Armonk, NY.

"Object Storage Architecture: Defining a new generation of storage systems built on distributed, intelligent storage devices," White Paper, Oct. 19, 2003, 18 pages, Panasas, Inc., Fremont, CA.

"Shared Storage Cluster Computing," Jan. 27, 2005, 22 pages, Panasas, Inc., Fremont, CA.

Menezes et al., Handbook of Applied Cryptography, Oct. 17, 1996, pp. 387, 400-402, CRC Press, New York, NY.

Gobioff, et al, "Security for Network Attached Storage Devices," CMU-CS-97-185, Oct. 23, 1997, 20 pages, School of Computer Science, Carnegie Mellon University, Pittsburg, Pennsylvania.

Gibson, et al., "Filesystems for Network-Attached Secure Disks," CMU-CS-97-118, Jul. 1997, 18 pages, School of Computer Science, Carnegie Mellon University, Pittsburg, Pennsylvania.

Gibson, et al., "File Server Scaling with Network-Attached Secure Disks," Proceedings of the ACM International Conference on Measurement and Modeling of Computer Systems (Sigmetrics '97), Seattle, Washington, Jun. 15-18, 1997, p. 272-284, Association for Computing Machinery, New York, NY.

Gibson, et al., "A Case for Network-Attached Secure Disks," CMU-CS-96-142, Sep. 26, 1996, 19 pages, School of Computer Science, Carnegie Mellon University, Pittsburg, Pennsylvania.

Gong. Li, A Secure Identity-Based Capability System, Jan. 1989, 16 pages, University of Cambridge Computer Laboratory, Cambridge, England.

IEEE P1619.3(TM)/D1, Draft Standard for Key Management Infrastructure for Cryptographic Protection of Stored Data (May 2007), 44 pages, IEEE, Piscataway, NJ.

IEEE P1619.1(TM)/D20 Draft Standard for Authenticated Encryption with Length Expansion for Storage Devices (Jun. 2007), 51 pages, IEEE, Piscataway, NJ.

IEEE P1619(TM)/D19 Draft Standard for Cryptographic Protection of Data on Block-Oriented Storage Devices (Oct. 2007), 38 pages, IEEE, Piscataway, NJ.

FIPS Publication 197, Announcing the Advanced Encryption Standard (AES), Nov. 26, 2001, 51 pages, National Institute of Standards and Technology, Gaithersburg, MD.

FIPS Publication 140-2, Security Requirements for Cryptographic Modules, May 25, 2001, 69 pages, National Institute of Standards and Technology, Gaithersburg, MD.

FIPS Publication 198, The Keyed-Hash Message Authentication Code (HMAC), Mar. 6, 2002, 20 pages, National Institute of Standards and Technology, Gaithersburg, MD.

Network Working Group, G. Waters, Editor, "User-based Security Model for SNMPv2," RFC 1910, Feb. 1996, 40 pages, The Internet Society, Reston, VA.

GXC3 Core, P1619 / 802.1ae (MACSec) GCM/XTS/CBC-AES Core, ipcores.com datasheet, Nov. 2007, 3 pages, IP Cores, Inc., Palo Alto, CA.

\* cited by examiner

EXTENT MAP

| FILE OFFSET | LOGICAL BLOCK ADDRESS | LENGTH | STATUS |
|---|---|---|---|
| ---------- | -------------------------- | ---------- | ---------- |
| ---------- | -------------------------- | ---------- | ---------- |
| ---------- | -------------------------- | ---------- | ---------- |
| ---------- | -------------------------- | ---------- | ---------- |

70

| KEY NO. | EXT. VBA | EXT. LBA | EXT. LENGTH | LUN | CLIENT ID | RO/RW |
|---|---|---|---|---|---|---|
| ------- | ------- | ------- | ------- | ------- | ------- | ------- |
| ------- | ------- | ------- | ------- | ------- | ------- | ------- |
| ------- | ------- | ------- | ------- | ------- | ------- | ------- |
| ------- | ------- | ------- | ------- | ------- | ------- | ------- |

134
THE STORAGE ARRAY RECEIVES THE SCSI READ OR WRITE COMMAND AND OBTAINS THE TOKEN AND THE LOGICAL BLOCK ADDRESS FROM THE LOGICAL BLOCK ADDRESS FIELD OF THE SCSI READ OR WRITE COMMAND. THE STORAGE ARRAY RE-COMPUTES THE KEY FROM A HASH OF THE CLIENT ID AND THE LOGICAL UNIT NUMBER, AND RE-COMPUTES THE TOKEN FROM A HASH OF THE KEY, A BIT INDICATING WHETHER THE SCSI COMMAND IS A READ OR WRITE COMMAND, AND THE LOGICAL BLOCK ADDRESS. THE STORAGE ARRAY COMPARES THE RECOMPUTED TOKEN TO THE TOKEN OBTAINED FROM THE LOGICAL BLOCK ADDRESS FIELD OF THE SCSI COMMAND, AND IF THE TOKENS ARE EQUAL, THEN THE STORAGE ARRAY ALLOWS READ OR WRITE ACCESS TO THE STORAGE OF THE LOGICAL UNIT AT THE LOGICAL BLOCK ADDRESS FROM THE LOGICAL BLOCK ADDRESS FIELD OF THE SCSI COMMAND, OR ELSE THE STORAGE ARRAY DENIES ACCESS AND RETURNS AN ERROR CODE TO THE CLIENT

135
FOR ADDITIONAL SECURITY, THE STORAGE ARRAY MAY MAINTAIN A LIST OF CLIENTS THAT ARE PERMITTED AT ANY GIVEN TIME TO ACCESS EACH LOGICAL UNIT STORED BY THE STORAGE ARRAY, AND CHECK THIS LIST UPON RECEIPT OF EACH SCSI READ OR WRITE COMMAND TO DENY READ OR WRITE ACCESS TO A LOGICAL UNIT BY A CLIENT THAT IS NOT ON THIS LIST. WHEN THE METADATA SERVER GRANTS A LOCK TO A CLIENT UPON FILE DATA IN A LOGICAL UNIT AND THE CLIENT HOLDS NO OTHER LOCKS ON THE LOGICAL UNIT, THE METADATA SERVER SENDS TO THE STORAGE ARRAY AN "ADD CLIENT TO LUN ACCESS CONTROL LIST" REQUEST INCLUDING THE CLIENT ID AND THE LOGICAL UNIT NUMBER, AND WHEN A CLIENT'S LOCK IS RELEASED AND THE CLIENT HOLDS NO OTHER LOCKS ON THE LOGICAL UNIT, THE METADATA SERVER SENDS TO THE STORAGE ARRAY A "REMOVE CLIENT FROM LUN ACCESS CONTROL LIST" REQUEST INCLUDING THE CLIENT ID AND THE LOGICAL UNIT NUMBER

FIG. 15

144

THE STORAGE ARRAY RECEIVES THE SCSI READ OR WRITE COMMAND AND OBTAINS THE TOKEN AND AN EXTENT LBA AND AN OFFSET FROM THE LOGICAL BLOCK ADDRESS FIELD OF THE SCSI READ OR WRITE COMMAND. THE STORAGE ARRAY RE-COMPUTES THE KEY FROM A HASH OF THE CLIENT ID AND THE LOGICAL UNIT NUMBER, AND RE-COMPUTES THE TOKEN FROM A HASH OF THIS KEY AND THE EXTENT LBA. THE STORAGE ARRAY COMPARES THE RE-COMPUTED TOKEN TO THE TOKEN OBTAINED FROM THE LOGICAL BLOCK ADDRESS FIELD OF THE SCSI COMMAND, AND IF THE TOKENS ARE EQUAL, THEN THE STORAGE ARRAY ALLOWS READ OR WRITE ACCESS TO THE STORAGE OF THE LOGICAL UNIT AT THE LOGICAL BLOCK ADDRESS IN BYTES 6 TO 9 OF THE LOGICAL BLOCK ADDRESS FIELD OF THE SCSI READ OR WRITE COMMAND, OR ELSE THE STORAGE ARRAY DENIES ACCESS AND RETURNS AN ERROR CODE TO THE CLIENT

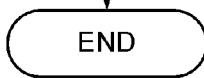

FIG. 17

166

THE METADATA SERVER MAY REVOKE ACCESS TO A FILE EXTENT BY SENDING A "REVOKE KEY" COMMAND TO THE STORAGE ARRAY. THE REVOKE KEY COMMAND INCLUDES THE KEY NO., LOGICAL UNIT NUMBER., EXTENT LBA, AND EXTENT LENGTH. THE STORAGE ARRAY RE-COMPUTES THE KEY LOCALLY BY HASHING THE KEY NO. AND THE LOGICAL UNIT NUMBER, AND RE-COMPUTES THE RESPECTIVE TOKEN LOCALLY FOR THE EXTENT BY HASHING THE KEY AND THE LBA OF THE EXTENT. FOR EACH FILE SYSTEM DATA BLOCK IN THE EXTENT, THE STORAGE ARRAY REMOVES FROM THE CACHE MEMORY THE RESPECTIVE TOKEN ASSOCIATED WITH THE LBA OF THE FILE SYSTEM DATA BLOCK.

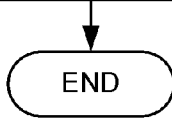

FIG. 20

ACCESS CONTROL TO BLOCK STORAGE DEVICES FOR A SHARED DISK BASED FILE SYSTEM

FIELD OF THE INVENTION

The present invention relates to data access controls for a shared disk based file system in which network clients share access to the file system by obtaining access permission and file metadata from a metadata server and then using a data block access protocol to access the file data in a block storage device.

BACKGROUND OF THE INVENTION

In a shared disk based file system, a plurality of computers share access to block storage devices that store file data. For example, network clients such as Microsoft Windows (Trademark) workstations may use the Common Internet File System (CIFS) protocol to access a shared disk based file system stored in a multi-protocol network file server, and network clients such as UNIX (Trademark) workstations may use the Network File System (NFS) protocol to access the shared disk based file system managed by the multi-protocol file server.

For enhanced data throughput, shared disk based file systems have been developed that permit network clients to share access to the file system by obtaining access permission and file metadata from a metadata server, and then using a high-speed data block access protocol to access the file data in one or more block storage devices. For example, as described in Vahalia, et al. U.S. Pat. No. 6,973,455 issued Dec. 6, 2005, incorporated herein by reference, a client is permitted to send data access commands directly to block storage of a network file server after obtaining a lock on at least a portion of the file and obtaining metadata indicating storage locations for the data in the block storage. For example, the client sends to the file server at least one request for access to a file. In response, the file server grants a lock to the client, and returns to the client metadata of the file including information specifying data storage locations in the block storage for storing data of the file. The client receives the metadata, and uses the metadata to produce at least one data access command for accessing the data storage locations in the block storage. The client sends the data access command to the block storage to read or write data to the file. For a write operation, the client may modify the metadata. When the client is finished writing to the file, the client returns modified metadata to the file server.

Shared disk based file systems are under development that permit a metadata server to grant extent-based range locks within a file to network clients. As described in David L. Black et al., "pNFS Block/Volume Layout," NFSv4 Working Group Internet Draft, Mar. 4, 2007, parallel NFS (pNFS) extends NFSv4 to allow clients to directly access file data on the storage used by the NFSv4 server. This ability to bypass the server for data access can increase both performance and parallelism, but requires additional client functionality for data access, some of which is dependent on the class of storage used. Layout extents returned to pNFS clients grant permission to read from or write to the extents. In general, the server will not be able to prevent a client which holds a layout for a file from accessing blocks of the physical disk not covered by the layout. In environments where the security requirements are such that client-side protection from access to storage outside the layout is not sufficient, pNFS block/volume layouts for pNFS should not be used.

Thus, shared disk based file systems that grant extent-based range locks to the clients and permit the clients to directly access the extents in a network block storage device raise security problems. There are two transports, the transport of the client access to the metadata server, and the transport of the client access to the network block storage device. Both of these transports should be secured, and have access controls implemented on them.

Most single host based file systems implicitly trust the host and the system administrator. The file system software running on the host is able to read and write to any block on the storage device that contains the file system, and the file system is responsible for implementing access controls. For most file systems this means that a super-user (root) can access any file in the file system. Users wishing to protect their data from root access must encrypt it, and ensure that even the super user does not have access to the encryption key.

Network based file systems introduce a new security model. In contrast to the single host file system, a network based file system defines two security domains. The first domain is the server domain, including the meta-data server in pNFS, the network block storage devices, and the server administrator, all of which are trusted. The second domain includes client machines and the client administrators, which are untrusted. As has been typical with NFS3 implementations, the file server administrator can explicitly configure the system such that a root user on a client host has no special privileges. This is often implemented by mapping the root user id (0) to a guest user id. No matter how the client machine is compromised, the file server still implements the access control and determines which data is accessible. Methods exist for securing the communications channel between the client and the file server, and systems like Kerberos can be used to strongly authenticate both the client identity and the user identity.

Shared SAN based file systems like MPFS and pNFS introduce new challenges in maintaining security. In these systems, untrusted hosts are granted read and write access to the storage devices used for the file system. As currently implemented using the standard SCSI-3 block command set (SBC-3), the storage device does not implement access control. In practice, LUN masking (storage groups), or other storage based mechanism are used to implement access control on a per logical unit basis, allowing only specific clients access to the storage. See, for example, Blumenau et al., U.S. Pat. No. 7,093,021 issued Aug. 15, 2006. Once a host is granted access to a logical unit, however, it can access any part of the logical unit. The host can read or write any block of the logical unit, and can possibly corrupt the file system. The assumption to date has been that the clients are in the same trust domain as the server. The assumption of clients being in the same trust domain as the server conflicts with the security model of NFS, and has caused problems such as malicious administrators writing to disks without having the proper rights granted, operator error, writing to disks using commands such as "dd", aggressive disk management software, writing volume labels on all unlabeled disks, and reading from or writing to any range on a disk once gaining access to the disk.

There have been a number of approaches to dealing with the problem of securing client access to a block storage device after the client has been granted access by a file manager or metadata server.

The problem of securing client access to a network-attached storage device after the client has been granted access by a file manager has been discussed in Howard Gobioff et al., "Security for Network Attached Storage Devices," Report CMU-CS-97-185, Oct. 23, 1997, School of Computer Science, Carnegie Mellon University, Pittsburgh, Pa. 15213. One approach to addressing this problem is called a grant-style approach, and another approach is called a capability approach.

In the grant-style approach, a client requests access from a file manager. The file manager grants client access and informs the network-attached storage device of the grant. The network-attached storage device acknowledges the grant. Once the network-attached storage device acknowledges the grant, the file manager provides the client with access information. The client then sends a request to the network-attached storage device, and receives a response.

In the capability approach, the client requests access from a file manager. The file manager responds by returning a "capability" to the client. The "capability" includes capability arguments and a capability key. The capability arguments contain a drive identifier, partition, object identifier, region (byte range), access rights, expiration time, minimum requirements, a basis key, and an audit identifier. The capability key is a cryptographic key used by a client to bind a specific storage device request to a capability through use of a machine identification code (MAC).

To address the problem of securing client access to a block storage device after the client has been granted access by a metadata server, EMC Corporation has used a host based filter driver (hrdp) which filters I/Os to block storage devices. Hrdp first scans all block storage devices looking to see if they have a label identifying an EMC Corp. "CELERRA" brand of storage device. If they do have such a label, a filter is installed which requires device open commands to pass a special flag. Any software that does not pass the special flag on open gets an error instead of a handle to the device. This solution solves some problems of operator error and aggressive disk management software, but still leaves the door open for incorrect install sequences and malicious system administrators. Such administrators can either remove the hrdp software, or can write their own programs and supply the special flag, thus gaining read/write access to the block storage devices.

An additional concern is a buggy host which does not respond to requests to return extents (layouts in pNFS) to the metadata server. In such a situation, either the host must fence itself from storage, which is unlikely since it has already refused to honor protocol requests, or the server must be capable of causing the storage to deny access of such a malfunctioning host.

SUMMARY OF THE INVENTION

It is desired to improve security of client access to a block storage device without a substantial impact on read-write performance after a metadata server grants the client access to an extent of file data of a shared-disk file system. It is desired to provide such a method that requires no change to the industry-standard SCSI protocol and client device drivers, and minimal changes to existing metadata servers and block storage devices. It has been discovered that these objectives can be met by the clients including tokens in the read or write commands sent to the block storage devices. The block storage device evaluates the token in each read or write command to determine whether or not the token permits the client to read from or write to storage at a logical block address specified by the read or write command.

In accordance with one aspect, the invention provides a method of securing access of a client to a block storage device in a data processing network. The block storage device stores file data of a shared-disk file system. The data processing network further includes a metadata server managing metadata of the shared-disk file system. The method includes the client sending a request to the metadata server for access to at least a portion of a file in the shared-disk file system, and the metadata server granting access of the client to the at least a portion of the file by returning to the client information specifying a token for validating read or write access to file data of the at least a portion of the file. The method further includes the client sending a read or write command to the block storage device for read or write access to storage of the block storage device. The read or write command includes the token and specifies a logical block address. The method further includes the block storage device receiving the read or write command from the client and evaluating the token to determine whether or not the token permits the client to read from or write to the storage at the specified logical block address, and to permit the client to read from or write to the storage at the specified logical block address upon determining that the token permits the client to read from or write to the storage at the specified logical block address.

In accordance with another aspect, the invention provides a method of securing access of a client to a block storage device in a data processing network. The block storage device stores file data of a shared-disk file system. The data processing network further includes a metadata server managing metadata of the shared-disk file system. The method includes the client sending a request for metadata of at least a portion of the file to the metadata server, and the metadata server receiving and responding to the metadata request by returning to the client file mapping information for the at least a portion of the file, the file mapping information including a pseudo-random virtual block address issued to the client for a corresponding logical block address of a range of contiguous block addresses in the at least a portion of the file. The method further includes the client sending a read or write command to the block storage device. The read or write command includes a block address field, and the block address field includes the pseudo-random virtual block address and a block offset. The method further includes the block storage device receiving the read or write command from the client, obtaining the pseudo-random virtual block address from the read or write command, performing a virtual-to-logical address translation upon the pseudo-random virtual block address from the read or write command to obtain the logical block address of the range of contiguous block addresses in the at least a portion of the file, and then permitting the client to read from or write to storage at the block offset from the specified logical block address in the block storage device.

In accordance with another aspect, the invention provides a block storage device. The block storage device includes data storage for storing file data, a network adapter coupled to the data storage for transfer of data between a client and the data storage, and at least one data processor coupled to the data storage and the network adapter for control of transfer of data between the network adapter and the data storage. The at least one data processor is programmed to receive a Small Computer System Interface (SCSI) read or write command from the client, and to evaluate a block address in a block address field of the Small Computer System Interface (SCSI) read or write command from the client to determine whether or not the block address in the block address field is a valid virtual block address, and upon determining that the block address in the block address field is not a valid virtual block address, to deny the client read or write access to the storage, and otherwise, upon determining that the block address in the block address field is a valid virtual block address, to produce a logical block address from the valid virtual block address and to permit the client to read from or write to the storage at the logical block address produced from the valid virtual block address.

BRIEF DESCRIPTION OF THE DRAWINGS

Additional features and advantages of the invention will be described below with reference to the drawings, in which:

FIGS. 14 and 15 together comprise a flowchart of the file access protocol used in the first embodiment of FIG. 6;

FIGS. 16 and 17 together comprise a flowchart of the file access protocol used in the second embodiment of FIG. 7;

FIGS. 18 to 20 together comprise a flowchart of the file access protocol used in the third embodiment of FIG. 8.

Figure 1:
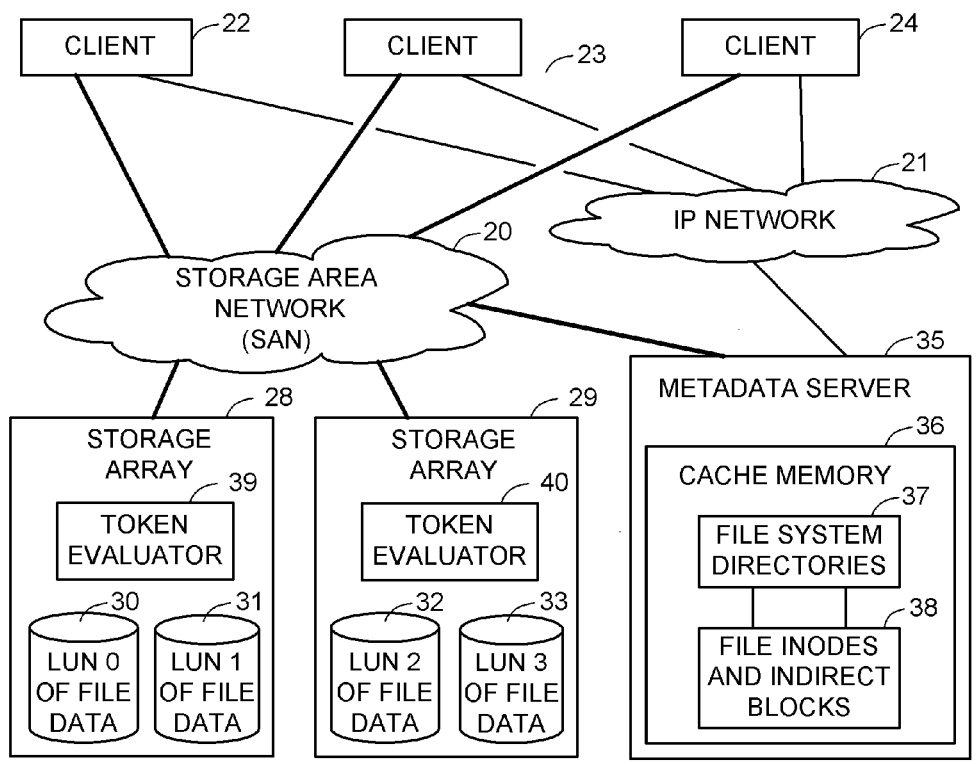
FIG. 1 is block diagram of a data processing network incorporating the present invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing system including clients 22, 23, 24; storage arrays 28, 29; and a metadata server 35. The clients 22, 23, 24 are linked directly to the storage arrays 28, 29 via a storage area network (SAN) 20. The clients 22, 23, 24 are linked directly to the metadata server 35 via an Internet protocol (IP) network 21.

The storage array 28 provides the clients 22, 23, 24 with access to logical unit numbers (LUNS) 0 and 1 of data storage 30 and 31 using the Small Computer System Interface (SCSI) protocol over a network protocol of the storage area network (SAN) 20. For example, the network protocol of the storage area network 20 is one of the IP protocol, the InfiniBand (IB) protocol, the Fibre Channel (FC) protocol, the Gigabit Ethernet (GE) protocol, etc. The storage array 29 provides the clients with access to logical unit numbers (LUNS) 2 and 3 of data storage 32 and 33 also using the SCSI protocol over the network protocol of the storage area network 20.

The metadata server 35 provides the clients 22, 23, 24 with access to metadata of a shared disk file system. For example, the metadata server 35 maintains a cache memory 36 of recently accessed file system directories 37, and file inodes and indirect blocks 38. The file inodes and indirect blocks 38 include pointers to logical block addresses of file data in the logical units of storage 30, 31, 32, 33.

As shown in FIG. 1, the metadata server 35 is linked directly to the SAN network 20 so that the storage arrays 28, 29 may store the file system metadata, and the metadata server 35 may fetch file system metadata as needed by reading the file system metadata over the storage area network 20 from the storage arrays 28, 29, and the metadata server 25 may commit new file system metadata by writing the new file system metadata over the storage area network 20 to the storage arrays 28, 29.

Figure 2:
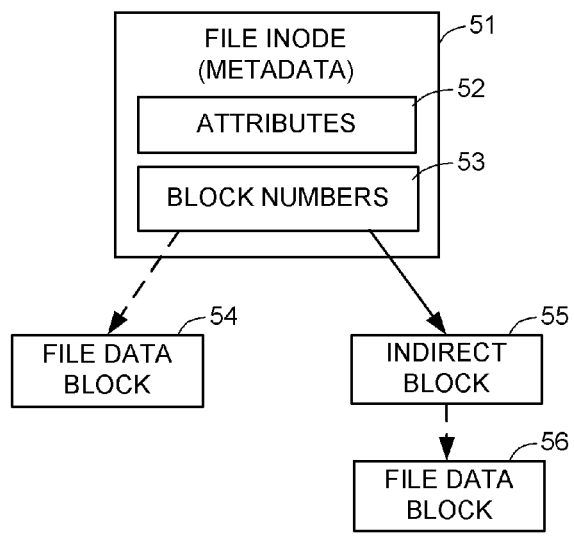
FIG. 2 is a block diagram of a file in a file system of FIG. 1.

For example, as shown in FIG. 2, the metadata of an inode 51 for a file includes attributes 52 and block numbers 53. The block numbers 53 point to other file system blocks such as a file data block 54 and an indirect block 55. The indirect block 55 may point to additional file data blocks and indirect blocks. In FIG. 2, for example, the indirect block 55 points to a file data block 56. The file inode 51, the indirect block 55, and the file data blocks 54, 56 typically have the same size, and this file system block size is multiple of the logical block size of data stored on block storage devices such as disk drives or storage arrays. For example, the file system block size is 8 kilobytes, and the logical block size is the standard disk block or disk sector size of 512 bytes. Further details regarding file system metadata and organization of file system blocks can be found in chapter 9 of Uresh Vahalia, *UNIX Internals: The New Frontier*, Prentice-Hall, Inc., 1996, p. 261-289.

Figure 3:
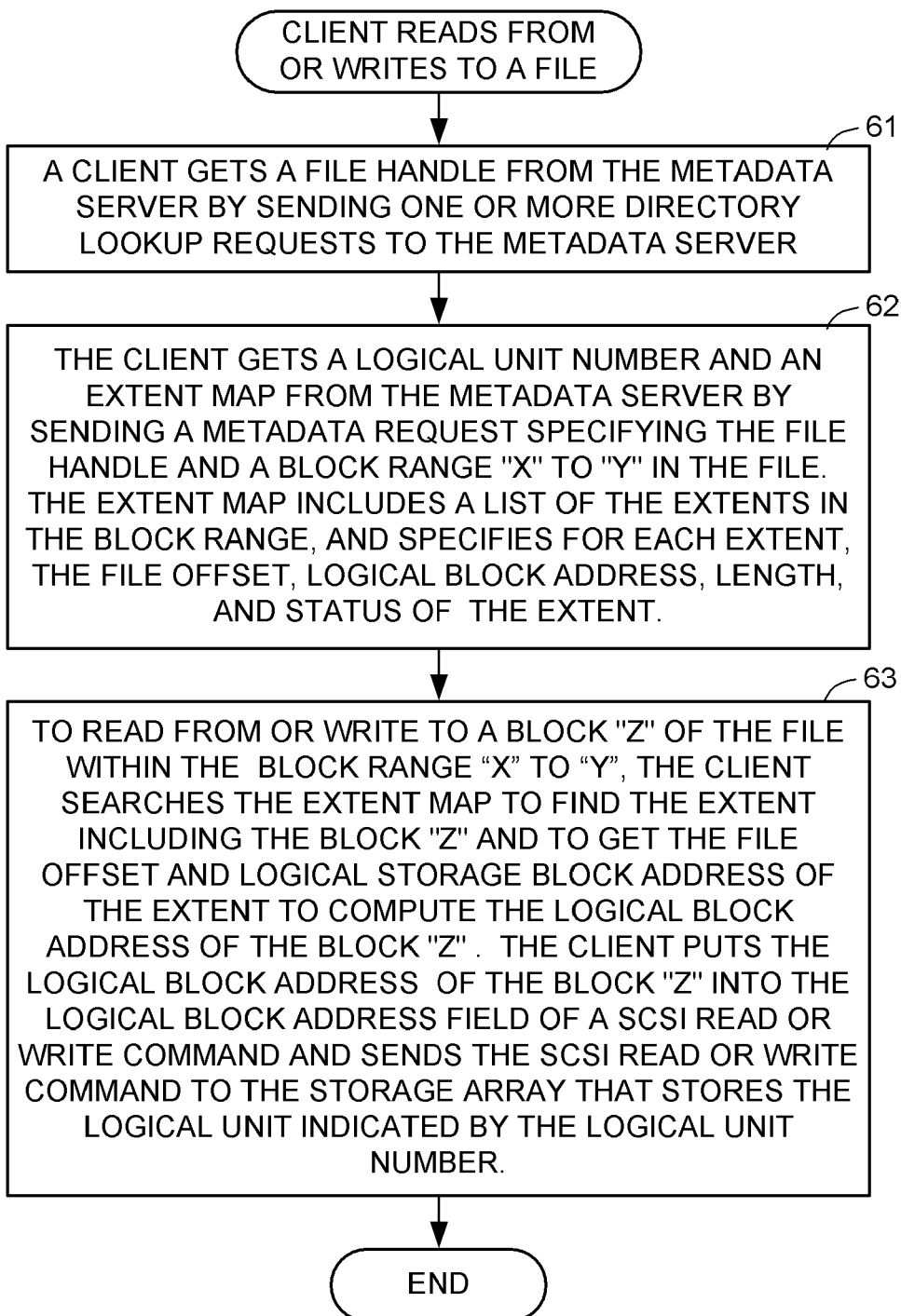
FIG. 3 is a flowchart of a basic file access protocol used by a client to obtain metadata from a metadata server and to use the metadata to access file data in a storage array.

FIG. 3 shows a flowchart of a conventional protocol used by a client for accessing a metadata server and a storage array for file access. In a first step 61, the client gets a file handle from the metadata server by sending one or more directory lookup requests to the metadata server. For example, the client uses the Network File System (NFS) protocol to get a file handle for a file specified by a pathname.

Figures 4, 5:
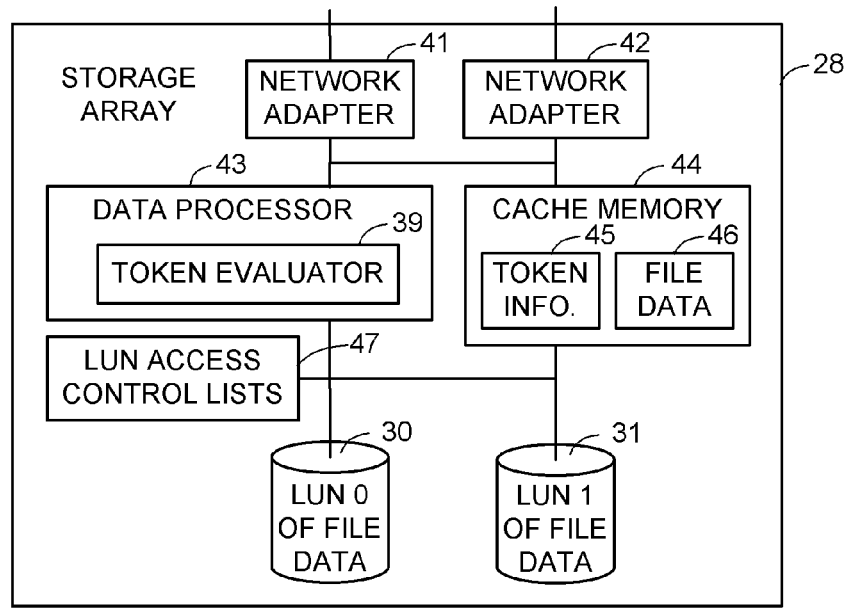
FIG. 4 is a block diagram of an extent map.
FIG. 5 is a block diagram of a storage array used in the network of FIG. 1.

In step 62, the client gets a logical unit number and an extent map from the metadata server by sending a metadata request specifying the file handle and a block range "X" to "Y" in the file. As shown in FIG. 4, such an extent map 70 includes a list of extents in the block range, and specifies for each extent, a file offset, logical block address, length, and status. Each extent is a range of contiguous logical block addresses of file data. The status, for example, specifies whether or not the extent is valid for reading and writing, valid for read only, invalid, or is a hole.

In step 63 of FIG. 3, to read from or write to a block "Z" of the file within the block range of "X" to "Y", the client searches the extent map to find the extent including the block "Z" and to get the file offset and logical storage block address of the extent to compute the corresponding logical block address of the block "Z." Assuming that the block "Z" is found in an offset that is valid for reading or writing as desired, the client puts the corresponding logical block address for the block "Z" into the logical block address field of a SCSI read or write command and sends the SCSI read or write command to the storage array that stores the logical unit indicated by the logical unit number from the metadata server.

As discussed above, in a shared disk file system including file data stored in a block storage device and metadata managed by a metadata server, there has been a problem of securing client access to the block storage device after the client has been granted access to a file by a metadata server. For example, in the conventional protocol of FIG. 3, the return of an extent map is an acknowledgement of a grant of a lock upon the portion of the file covered by the extent map. To avoid inconsistency and corruption of the file, other clients should not concurrently access the same portion of the file unless the metadata server also grants them a lock upon the file.

In order to provide more secure client access to the storage arrays 28 and 29 in the data processing network of FIG. 1, the metadata server 35 grants a client access to at least a portion of a file by returning to the client information specifying a token for validating read or write access to the file data. The client includes the token in the read or write command sent to the storage array storing the file data to be accessed. Each of the storage arrays 28, 29 includes a respective token evaluator 39, 40 for evaluating the token to determine whether or not the token permits the client to read from or write to the storage at a logical block address specified by the read or write command. If the token permits the client to read to or write from the specified logical block address, then the token evaluator enables the storage array to execute the read or write command so that the client reads from or writes to the specified logical block address. Otherwise, the storage array returns to the client an error code, such as an ILLEGAL REQUEST sense key.

FIG. 5 shows further details of the storage array 28. The storage array 28 includes network adapters 41 and 42 coupled to the data storage 30 and 31 for transfer of data between a network client and the data storage. For example, normally the network adapter 41 is assigned a network address for reading or writing to LUN 0 of the data storage 30, and the network adapter 42 is assigned a network address for reading or writing to LUN 1 of the data storage 31. The storage array 28 further includes a data processor 43 coupled to the data storage 30, 31 and to the network adapters 41, 42 for control of the transfer of data between the network adapters 41, 42 and the data storage 30, 31. For example, the data processor 43 is programmed to control access of the network clients to particular logical units by maintaining and referencing LUN access control lists 47 that include, for each logical unit 30, 31, a list of client identifiers of network clients that are permitted to access the logical unit.

The data processor 43 is also programmed to receive a SCSI read or write command from a client, and to pass the contents of a logical block address field of the SCSI read or write command to a token evaluator routine 39 that determines whether or not the block address in the logical block address field is a valid virtual block address. If the token evaluator 39 determines that the block address in the logical block address field is not a valid virtual block address, then the data processor 43 denies the client read or write access to the data storage, and instead returns an error code to the client. Otherwise, if the token evaluator determines that the block address in the block address field is a valid virtual block address, the data processor 43 produces a logical block address from the valid virtual block address and permits the client to read from or write to the storage of the logical block address produced from the valid virtual block address.

The data storage 30, 31 of the storage array 28, for example, is disk storage. The storage array 28 has a cache memory 44 for storing recently accessed file data 46. The cache memory 44 is a kind of associative memory permitting physical memory locations to be associated with different logical block addresses so that least recently accessed file data in the cache memory can be over-written with data currently being read or written when the data processor 43 finds that data to be accessed is absent from the cache memory and therefore the data processor 43 fetches the data from the data storage 30, 31.

The token evaluator 39 is designed so that the virtual block address from the block address field of the SCSI read or write command is evaluated during the time that the cache memory 44 is being accessed to determine whether or not the file data 46 is associated with the logical block address specified by the SCSI read or write command. Thus, incorporation of the token evaluator 39 into the storage array 28 may have an insubstantial effect on the storage access time. In addition, as further described below with reference to FIGS. 8 and 9, the token evaluator 39 may use some of the same software and hardware as the cache memory 44. For example, the token evaluator 39 may use some token information 45 stored in the cache memory 44 in association with the file data 46 in the cache memory. The token evaluator 39 may also use associative or content addressable memory hardware especially designed for the address translation buffer of a virtual memory system.

Incorporation of a token evaluator into an existing storage array design may require a rather small or a rather large degree of modification depending on the degree of security desired in the storage area network. On one hand, a rather low level of security may be acceptable for a closed and secure local storage area network in which some protection is desired against a client that might produce erroneous read-write addresses due to a software bug or processor crash. On the other hand, a rather high degree of protection may be desired for an open storage area network in which a malicious client may monitor network traffic and then attempt to corrupt or modify data stored by another client at a particular logical storage address.

A particular way of incorporating a token evaluator into a storage array may require more or less modification of existing client software or existing metadata server software. For some existing networks, it may be desired to provide a solution that requires no modification to the client software. For other existing networks, it may be desired to provide a solution that requires no modification to the metadata server.

A particular way of incorporating a token evaluator into a storage array may require more or less direct communication between the metadata server and the storage array that would bypass the clients. For some networks, the metadata server and the storage array are co-located in a secure data center, so that direct communication between the metadata server and the storage array may occur quickly over a dedicated link without affecting client data access performance. For other networks, direct communication between the metadata server and the storage array may impact client data access performance.

In view of these considerations, a number of specific ways will be described for creating and evaluating the tokens in the SCSI read and write commands. First will be described networks in which each SCSI read or write command includes both a logical block address (LBA) and a token. The storage array evaluates the LBA in the context of the token to decide if the read or write is permitted. In a first embodiment, the token is created by the client so that no change is needed to existing metadata server software and no direct communication is needed between the metadata server and the storage array. In other embodiments, the token is created by the metadata server so that no change is needed to existing client software.

Figure 6:
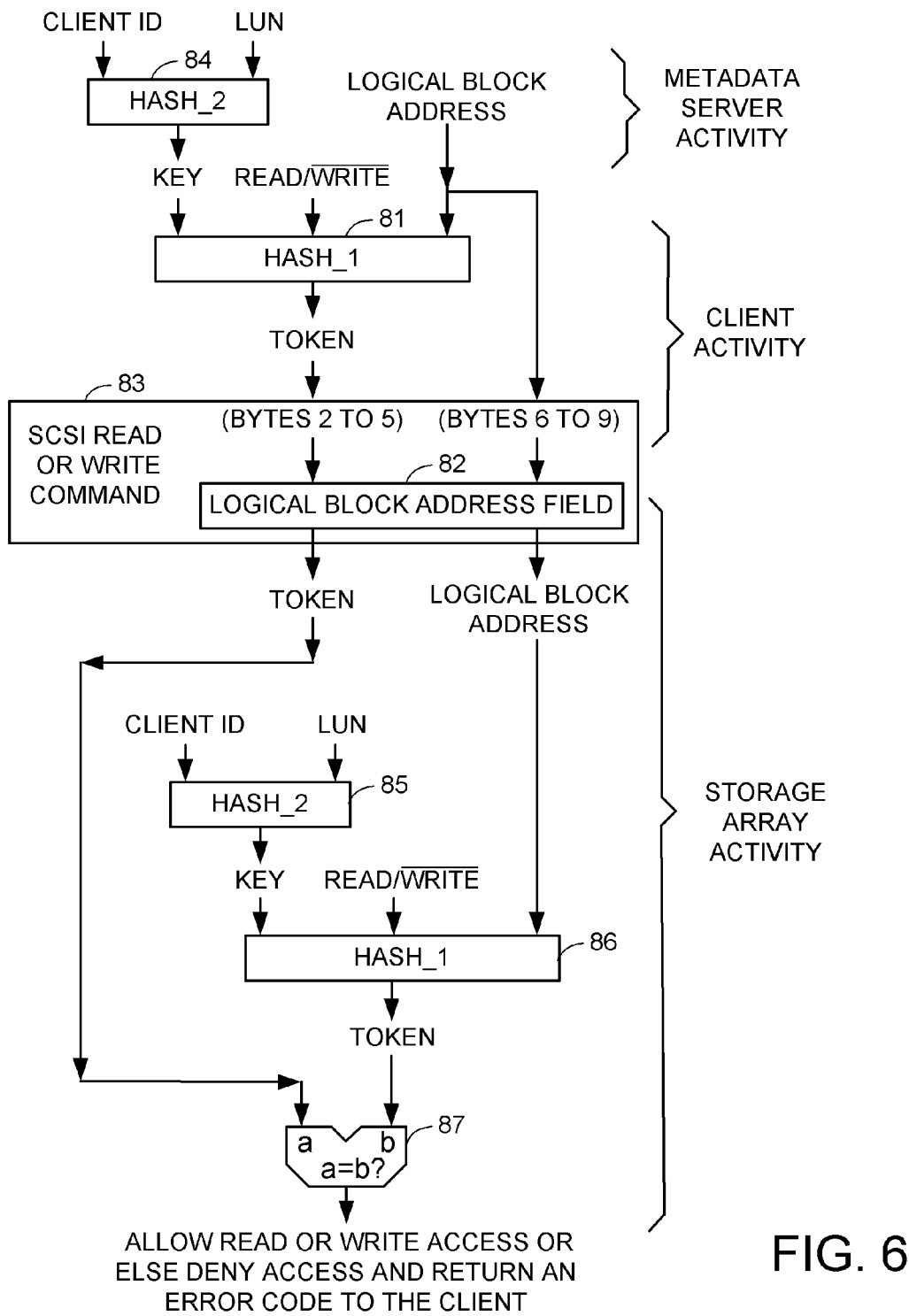
FIG. 6 is a flow diagram of block address and token information in a first embodiment of the present invention in which a client computes a token from a key and a logical block address, and inserts the token and the logical block address in the logical block address field of a SCSI read or write command to a storage array.

FIG. 6 shows a first embodiment in which the token is a function or hash 81 of the LBA, a bit indicating whether the SCSI command is a read or a write command, and a key unique to the client. For example, the LBA is a four-byte number for addressing a logical unit containing up to 2*exp(32)=4 G disk blocks or a total of two terabytes of storage for a logical block size of 512 bytes. In this example, the token is also a four-byte number, so that a concatenation of the token with the LBA fills the eight bytes of the logical block address field 82 of the SCSI read or write command 83. For example, the token fills bytes 2 to 5 of an SCSI Read(16) command or Write(16) command, and the LBA fills bytes 6 to 9 of the SCSI Read(16) or Write(16) command.

In general, the function or hash is computed by lookup in a table or by execution of a series of data processor instructions so that a pseudo-random number sequence is generated when any argument of the function or hash is sequentially incremented. For example, to produce a hash ranging from 0 to 2*exp(n−1)−1 from arguments having a total of "m" bits, a table having an n-bit entry size and 2*exp(m) entries is loaded sequentially with the numbers from 0 to 2*exp(n−1)−1, and then the entries in the table are shuffled at random so that the table stores a random permutation of the numbers. The arguments are concatenated to produce an index for indexing the table. If m<n, the numbers omitted from the table are selected at random. If m>n, the numbers that appear more frequently in the table are selected at random.

A hash from arguments having a relatively large total number of bits is performed conveniently by concatenating the arguments to form a string of bits and then encrypting the string of bits using a standard encryption technique such as the Advanced Encryption Standard (AES) described in the Federal Information Processing Standards (FIPS) Publication 197 published Nov. 26, 2001, by the United States National Institute of Standards and Technology (NIST), Gaithersburg, Md.

For example, the key is a hash 84 of a client identifier and the number of the logical unit to be accessed by the SCSI command, and the metadata server computes the key and issues the key to the client to enable access of the client to the particular logical unit. The client, before issuing a SCSI read or write command, computes the token from the key and the LBA to be accessed by invoking the hash 81, and then the client inserts the token and the LBA into the logical block address field 82 of the SCSI command 83.

The client sends the SCSI command 83 to the storage array containing the logical unit of storage to be accessed. The storage array re-computes the client's key for the logical unit by a hash 85 of the client ID and the logical unit number. The hash 85 evaluates the same function as the hash 84 used by the metadata server to compute the key. The storage array then re-computes a hash 86 of the LBA from the logical block address field 82 of the SCSI command 83 and the client's key from the hash 85 and a bit indicating whether the SCSI command 83 is a read command or a write command. The hash 86 evaluates the same function as the hash 81 used by the client. The storage array then performs a comparison 87 of the re-computed token from the hash 86 with the token from the logical block address field 82 of the SCSI command 83. If the re-computed token from the hash 86 is equal to the token from the logical block address field 82 of the SCSI command 83, then the storage array permits read or write access to the LBA of the logical unit of storage, as requested by the SCSI command. Otherwise, the storage array denies access and returns an error code to the client.

Thus, the generation and use of a token as shown in FIG. 6 solves the problem of inadvertent reads and writes due to aggressive disk management software, operator error, and operators who remove the host based protection (hrdp) software. It still would be possible for a malfunctioning client to access the entire logical unit once the client has been given a key for the logical unit because the client has the hash 81 to generate tokens for accessing the entire logical unit. It also would be possible for a malicious client or malicious system administrator to access the entire logical unit given any client's key and knowledge of what client the key belongs to, because the malicious client or malicious system administrator would also have access to or knowledge of the hash 81 for generating the token for any given LBA.

Figure 7:
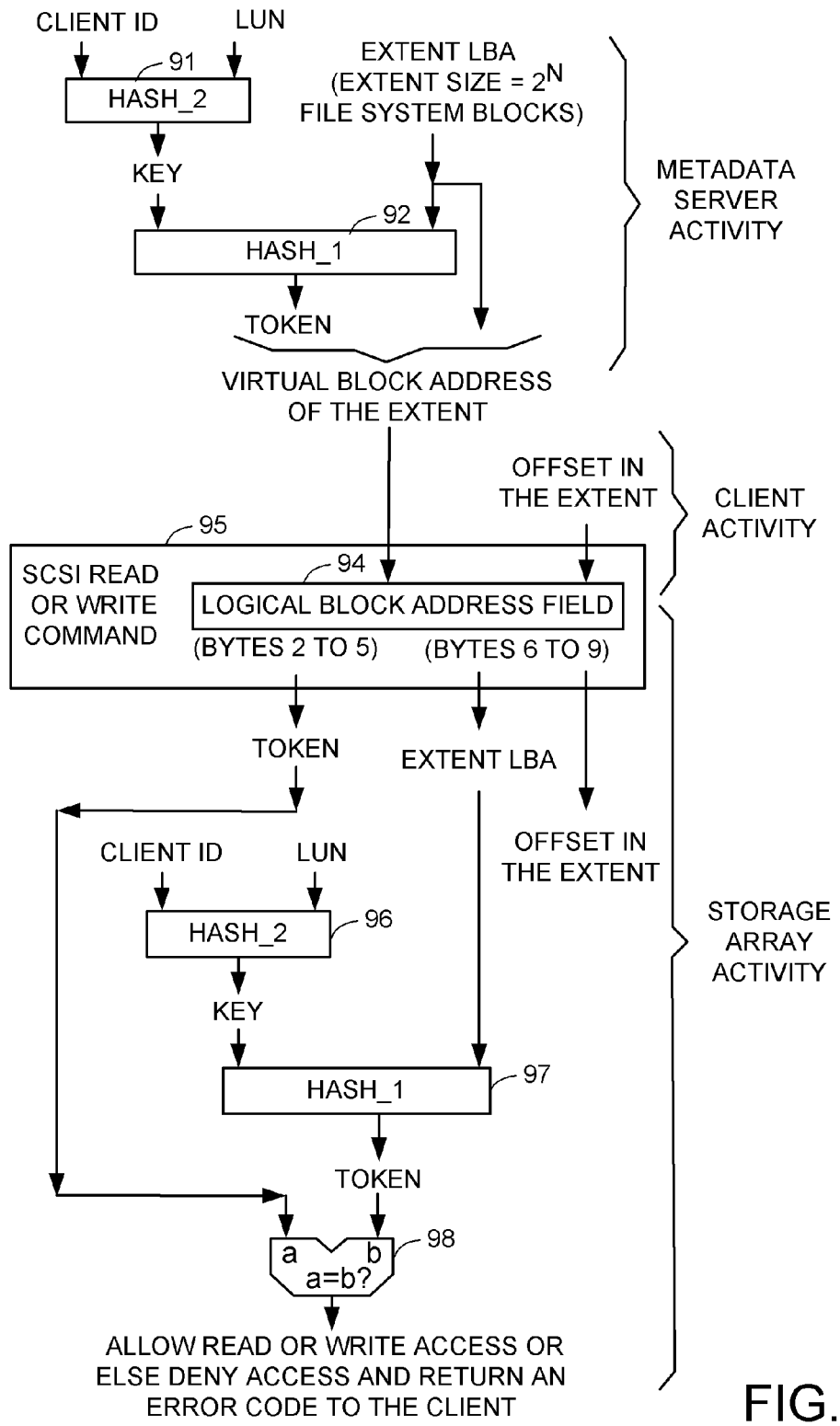
FIG. 7 is a flow diagram of block address and token information in a second embodiment of the present invention in which a metadata server computes a token from a key and a logical block address of an extent, and combines the token and the key to form a virtual block address that is sent to the client in an extent map.

FIG. 7 shows a method of generating and using a token that provides some additional protection from a malfunctioning or malicious client. The method of FIG. 7 also has the advantage that there is no need to modify the existing client software. The server again generates a key for access of a particular client to a particular logical unit by a hash 91 of the client ID and the logical unit number, but the key is not sent to the client. Instead, in response to a metadata request from the client, the metadata server returns a virtual block address for each extent of a minimum size in the file offset range specified by the metadata request. Thus, the extent length reported to the client in the extent map is always an extent of a minimum extent length. For example, the minimum extent length is $2^N$ file system blocks, where N is a pre-selected integer of zero or more. The metadata server computes a token by invoking a function or hash 92 of the key and the LBA of the extent to be reported to the client, and the metadata server computes the virtual address of this extent by concatenating the token with the LBA of this extent, and inserts this virtual address in the extent map returned to the client.

For accessing a particular block in an extent in the extent map, the client computes a virtual block address of the block by concatenating an offset of the block in the extent with the virtual block address of the extent, and inserts this virtual block address into the logical block address field 94 of the SCSI read or write command 95.

The storage array receives the SCSI read or write command 95 and obtains the token from bytes 2 to 5 in the logical block address field 94 and obtains the LBA of the block to be accessed from bytes 6 to 9 in the of the logical block address field. The most significant bits of this LBA specify the LBA of the file system data block to be accessed, and the least significant bits of this LBA are the offset of the logical block to be accessed in the extent. For the case of a file system data block of 8 K bytes and a logical block of 512 bytes, the offset in the file system data block is a four-bit number, and the offset in the extent (as reported to the client) is an M-bit number where M equals three plus N and where N is the number of file system blocks in the extent of minimum size, as discussed above.

The storage array re-computes the key from a hash 96 of the client ID of the client that is the source of the SCSI read or write command 95, and the logical unit number of the logical unit to be accessed. The hash 96 evaluates the same function as the hash 91 used by the metadata server. The storage array also re-computes the token from a hash 97 of the key and the extent LBA. The hash 97 evaluates the same function as the hash 92 used by the metadata server. The storage array performs a comparison 98 of the re-computed token to the token obtained from the logical block address field 94 of the SCSI read or write command 95. If the re-computed token from the hash 97 is equal to the token from the logical block address field 94 of the SCSI command 95, then the storage array permits read or write access to the logical unit of storage at the logical block address in bytes 6 to 9 of the logical block address field 94 of the SCSI read or write command 95. Otherwise, the storage array denies access and returns an error code to the client.

Figure 8:
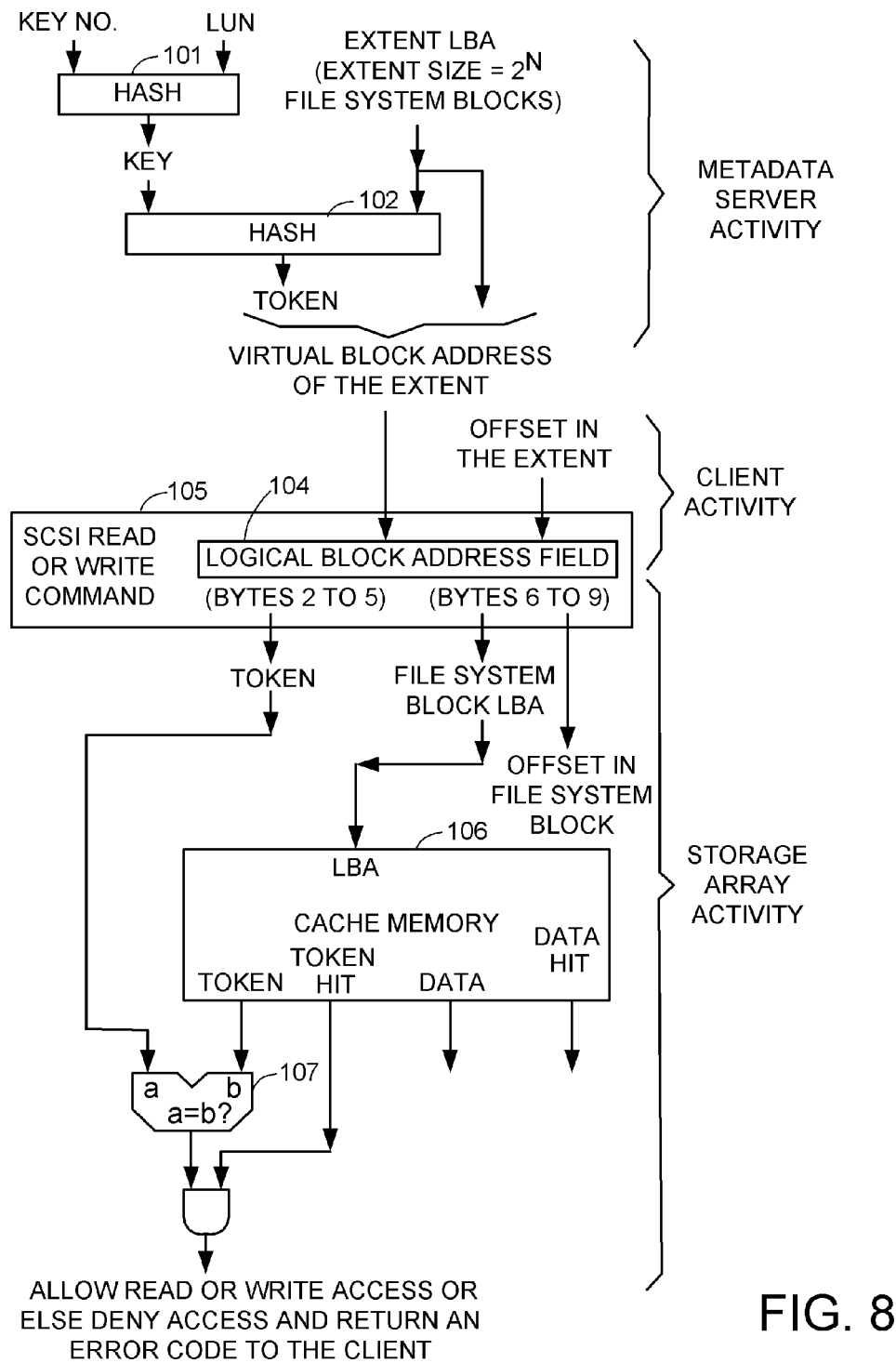
FIG. 8 is a flow diagram of block address and token information in a third embodiment of the present invention in which tokens are stored in association with logical block addresses in a cache memory of a storage array so that evaluation of a token in the logical block address field of an SCSI read or write command is performed in parallel with a lookup of file data in the cache memory.

FIG. 8 shows a method of generating and using a token that is similar to the method of FIG. 7 but provides some additional security by enabling the relationship between the extent LBA and the token to be changed dynamically for each extent reported to the client. In this method, this relationship is specified by a key number that is freely associated with each extent reported to the client. For example, the key number is incremented each time that the metadata server computes the token and inserts the token and the extent LBA into the LBA of an extent entry of the extent map. The key number and its associated extent LBA are then sent directly from the metadata server to the storage array including the logical unit of storage containing the file system data blocks mapped by the extent map. Therefore this method is most suitable for a network in which the metadata server and the storage array are co-located. The storage array may then re-compute the token for the extent LBA, and store the token in its cache memory 106 in association with each file system data block in the extent having the LBA. If the metadata server and the storage array are co-located in a secure data center, the metadata server may also send the token in association with the extent LBA so that the storage array need not re-compute the token.

When the metadata server responds to a metadata request from a client, the metadata server increments a key number and computes a key by a hash 101 of the key number and the logical unit number of the logical unit containing the file system data blocks to be mapped. The key number is incremented and hash 101 computes a respective key for each extent to be reported to the client in the file offset range specified in the metadata request. Again, each extent reported to the client has the minimum extent size of $2^N$ file system data blocks. The metadata server computes a token by a hash 102 of the key with the LBA of the extent to be reported to the client. The metadata server then concatenates the token with the LBA of the extent to produce a virtual block address of the extent reported in the extent map returned to the client.

To access a particular disk block in the extent, the client concatenates the block offset in the extent to the virtual block address of the extent to produce a virtual block address that the client inserts into the logical block address field 104 of a SCSI read or write command 105.

When the storage array receives the SCSI read or write command 105, the storage array obtains a token, a file system data block LBA, and an offset in the file system data block from the logical block address field 104 of the SCSI command, and addresses its cache memory 106 with this file system block LBA. The storage array reads a token from its cache memory 106 and performs a comparison 107 of this token from the cache memory 106 to the token obtained from the logical block address field 104 of the SCSI read or write command 105. If the token read from the cache memory 106 is equal to the token from the logical block address field 104 of the SCSI command 105 and a token hit signal from the cache memory 106 indicates that the token read from the cache memory 106 is valid, then the storage array permits read or write access to the specified offset in the specified file system data block of the logical unit number, as requested by the SCSI command. Otherwise, the storage array denies access and returns an error code to the client.

The metadata server may revoke a client's access to a particular file system data block by requesting the storage array to flush the token associated with the file system data block from its cache memory 106. To permit re-use of a token for different extents of the minimum size, the tokens have a limited lifetime. When a token is loaded into the cache memory, the token in the cache memory 106 is tagged with a timestamp. In this case, whenever a token is read from the cache memory, its timestamp is inspected to invalidate the stale tokens. Thus, a token can be re-used after expiration of is lifetime.

Figure 9:
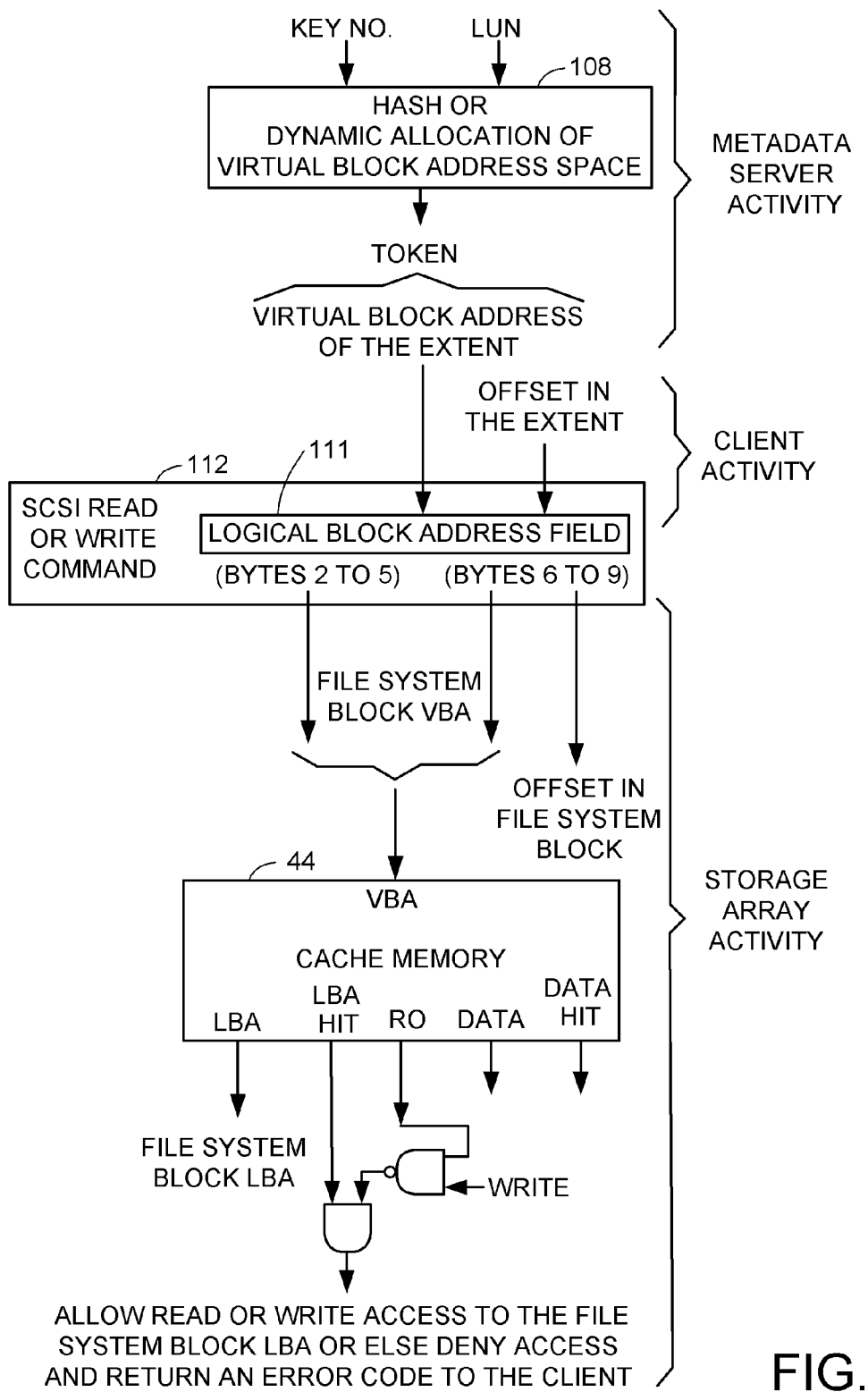
FIG. 9 is a flow diagram of block address and token information in a fourth embodiment of the present invention in which tokens are virtual block addresses of extents and the tokens are stored in association with logical block addresses in a cache memory of a storage array so that evaluation of a token in the logical block address field of an SCSI read or write command is performed in parallel with a lookup of file data in the cache memory and so that tokens can be freely associated with file system data blocks and with clients.

FIG. 9 shows a method of generating and using a token that is similar to the method of FIG. 8 but provides some additional flexibility in the protection of file extents. In this method, the token is a virtual block address of an extent to be protected. A token can be freely associated with a particular client and with a particular extent. For example, each of a plurality of clients can be issued a different token for access to the same extent of a file. In this case, a token can also be tagged in the storage array cache memory to indicate whether the token has been issued for read-only access, in order to deny access to a client with read-only access attempting to write to an extent. The flow of token information from the metadata server 35 to the client 22 and to the storage array 28 for this method is further shown in FIG. 10.

In general, use of a token as a virtual address of an extent provides security of client access because the mapping of the virtual block address to the logical block address is private information. A high degree of security is possible if the size of the virtual address space is much greater than the size of the logical address space. In addition, the private mapping information can be created at the time that a particular client is granted access to an extent of the file data, and the mapping can be invalidated by expiration or by explicit revocation of the token.

In FIG. 9, when the metadata server adds an entry to the extent map, the metadata server increments a key number and computes a token as a hash 108 of the key number and the logical unit number of the logical unit containing the file data to be accessed. The token is inserted into the LBA field of the extent in the extent map, and the token serves as a virtual block address of the extent. The metadata server returns the extent map to the client having requested the mapping information.

The extent map returned to the client could include extents of different lengths so long as there would be no overlap in the virtual address space between different file extents. For permitting a wide range of extent lengths to be reported to the client, instead of using a hash to select the virtual block address of an extent, the contiguous virtual addresses for the file system data blocks in an extent could be dynamically allocated from the free virtual address space using a random or pseudo-random selection process. In this case, the free virtual address space and the allocated virtual address space at any given time could be indicated by a bitmap maintained in memory of the metadata server. Free extents of virtual address space of various lengths could be pre-selected in a background process so that the metadata server could quickly return an extent map including variable-length extents and pseudo-random virtual block addresses in response to a metadata request. By using such a dynamic allocation scheme, it also would be possible to combine multiple extents of a file into a single virtual extent that is reported to the client, so long as the particular virtual-to-logical block address mapping of each file system data block in the virtual extent is also reported to the storage array storing the logical unit of the file data.

Figures 10, 11:
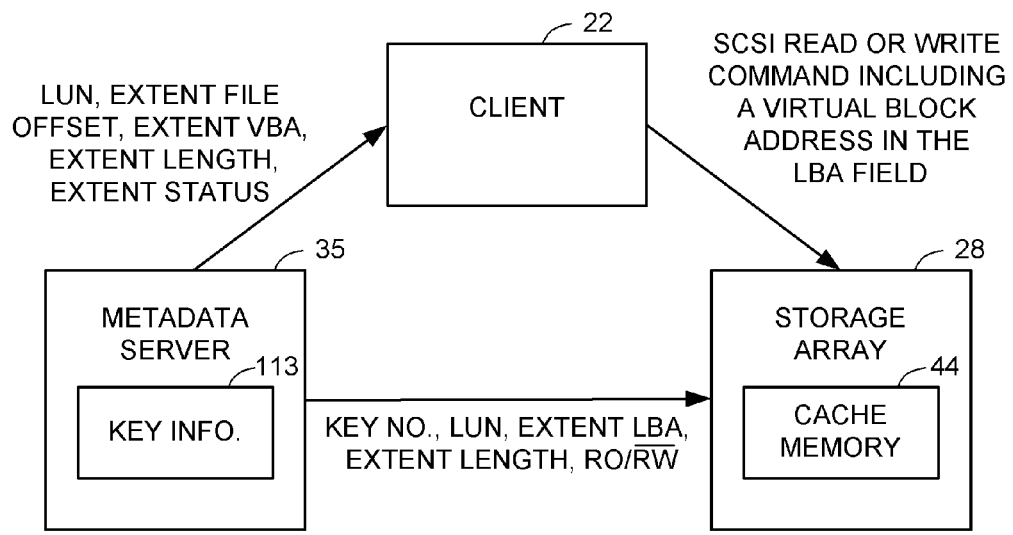
FIG. 10 shows a flow of information about an extent from a metadata server to a storage array in the fourth embodiment of the invention of FIG. 9.
FIG. 11 is a table of key information stored in the metadata server of FIG. 10.

As shown in FIG. 10, for example, the metadata server 35 sends, to the storage array 28 that stores the logical unit, a report of the key number, logical unit number, extent LBA, extent length, and a bit indicating whether the token was issued to the client for read-only access. Upon receipt of this report, the storage array 28 re-computes the token by hashing the key number with the logical unit number. If the metadata server 35 and the storage array 28 are co-located in a secure data center, then the metadata server could send the token instead of the key number to the storage array so that the storage array would not need to re-compute the token. The storage array 28 then stores the extent LBA in association with the token in its cache memory 44 so that the token (instead of the LBA) will be the address or "primary key" for the information stored in the cache memory. If the length of the extent includes more than one file system data block, then the storage array computes the virtual block address (VBA) and corresponding LBA of each of the additional file system data blocks by successively incrementing the VBA and LBA of the extent, and stores each LBA in association with its respective VBA into the cache memory 44.

As shown in FIG. 9, to access a particular logical block in the extent, the client concatenates the block offset in the extent with the virtual block address of the extent to produce a virtual block address that the client inserts into the logical block address field 111 of a SCSI read or write command 112.

When the storage array receives the SCSI read or write command 112, the storage array obtains a file system block VBA and an offset in the file system block from the logical block address field 111 of the SCSI command, and addresses its cache memory 44 with this file system block VBA. If an LBA is found in the cache memory 44 in association with the file system block VBA from the SCSI command 112 and it is not true that the VBA is tagged in the cache memory 44 as read-only and the SCSI command is a write command, then the storage array allows read or write access to the file system block having the LBA associated in the cache memory with the file system block VBA from the SCSI command, and performs a read or write upon the file system block at the LBA from the cache memory and at the offset obtained from the SCSI command. Otherwise, the storage array denies access and returns an error code to the client.

The metadata server may revoke a client's access to a particular file system extent by requesting the storage array to flush the LBAs associated with the VBAs of the file system data blocks in the extent reported to the client. For example, as shown in FIG. 11, the metadata server (35 in FIG. 10) maintains a table 113 of key information for unexpired read locks and write locks upon file extents. For each unexpired read lock or write lock, the table 113 includes an entry containing the key number, extent VBA, extent LBA, extent length, logical unit number, client identifier, and a flag indicating whether the lock is for read-only access. The metadata server may also search this table 113 to find information for revoking access of a client to a particular extent in a given logical unit, or to revoke all access by a given client ID to an entire logical unit, or all access of a given client.

For example, when a clients' access to a given extent in a given logical unit is revoked, the metadata server 35 sends a "revoke key" command to the storage array 28 storing the logical unit, and the "revoke key" command includes the key number, the extent LBA, and the extent length. Upon receipt of the "revoke key" command, the storage array 28 uses the key to re-compute the extent VBA. If the metadata server 35 and the storage array are co-located in a secure area, the metadata server 35 may include the extent VBA in the "revoke key" command so that the storage array need not compute the extent VBA.

To permit re-use of a token for different file system data blocks, when a VBA is loaded into the cache memory 44, the VBA in the cache memory is tagged with a timestamp. In this case, when a LBA is read from the cache memory 44, the timestamp of the VBA is inspected and access to the file system data block at the associated LBA is denied if the timestamp indicates that the VBA is stale.

Figure 12:
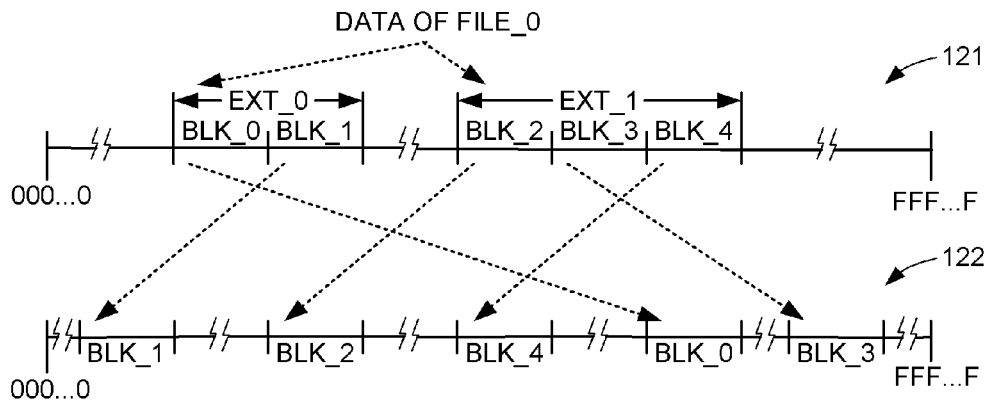
FIG. 12 shows a logical-to-virtual address mapping for the second and third embodiments of FIGS. 7 and 8.

FIG. 12 shows a logical-to-virtual address mapping for the second and third embodiments of FIGS. 7 and 8 assuming a minimum extent size of one file system block is reported to the client in the extent map. In the logical address space 121 of a logical unit (LUN_0) of block storage, the data of a file (FILE_0) includes two extents (EXT_0 and EXT_1). The first extent (EXT_0) includes two file system data blocks (BLK_0 and BLK_1) and the second extent (EXT_1) includes three file system data blocks (BLK_2, BLK3, and BLK_4). The hash of the logical block addresses appears to shuffle the order of the file system data blocks at random and disperse the file system data blocks at random over the virtual address space 122 accessed by the client (CLIENT_0). Thus, each file system data block in the virtual address space 122 has a pseudo-random virtual block address. Nevertheless, there is a one-to-one mapping of virtual block addresses of the file system data blocks within the virtual address space 122 to corresponding logical block addresses of the file system data blocks within the logical address space 121.

In contrast to FIG. 12, for the first embodiment of FIG. 6, the hash of the logical block addresses appears to shuffle the order of the logical blocks of file data at random and disperse the logical blocks of file data at random over the virtual address space accessed by the client.

Figure 13:
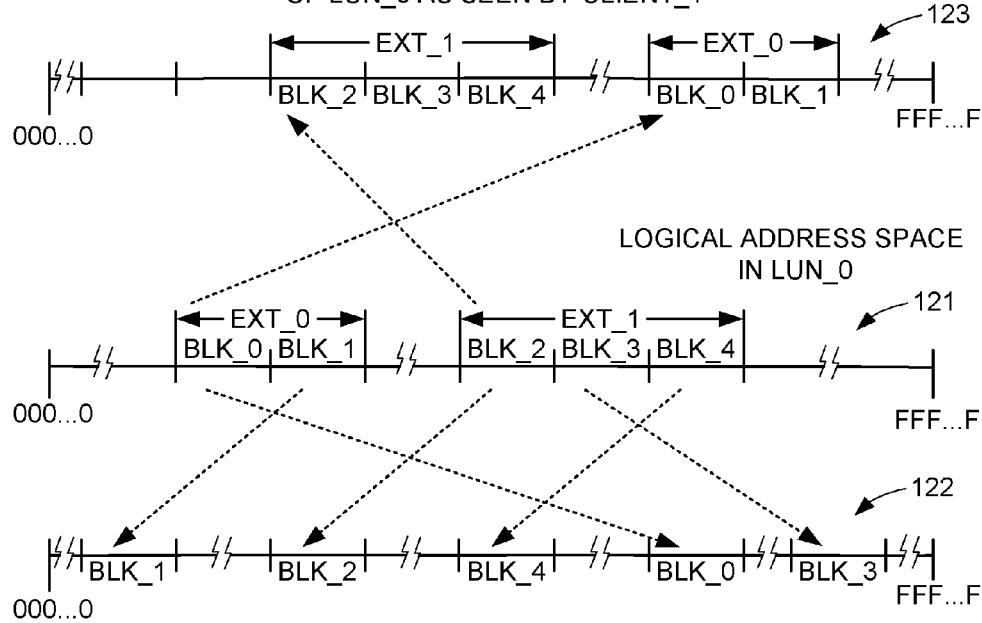
FIG. 13 shows a logical-to-virtual address mapping for the fourth embodiment of FIG. 9.

FIG. 13 shows a logical-to-virtual address mapping for the fourth embodiment of FIG. 9. In this example, the mapping for a first one of the clients (CLIENT_0) is the same as in FIG. 12 in which each file system data block is reported to the client as a separate extent, but the mapping for a second one of the clients (CLIENT_1) includes a dynamically allocated pseudo-random virtual block address for each extent. Thus, the extents reported to the second client may include extents of different lengths. In FIG. 13, for example, the extents in the virtual address space 123 accessed by the second client (CLIENT_1) include the same extent lengths as the extents of the file in the logical address space 121, and each extent in the virtual address space 123 accessed by the second client includes the same file system data blocks in the same order as they appear in the logical address space 121.

Figure 14:
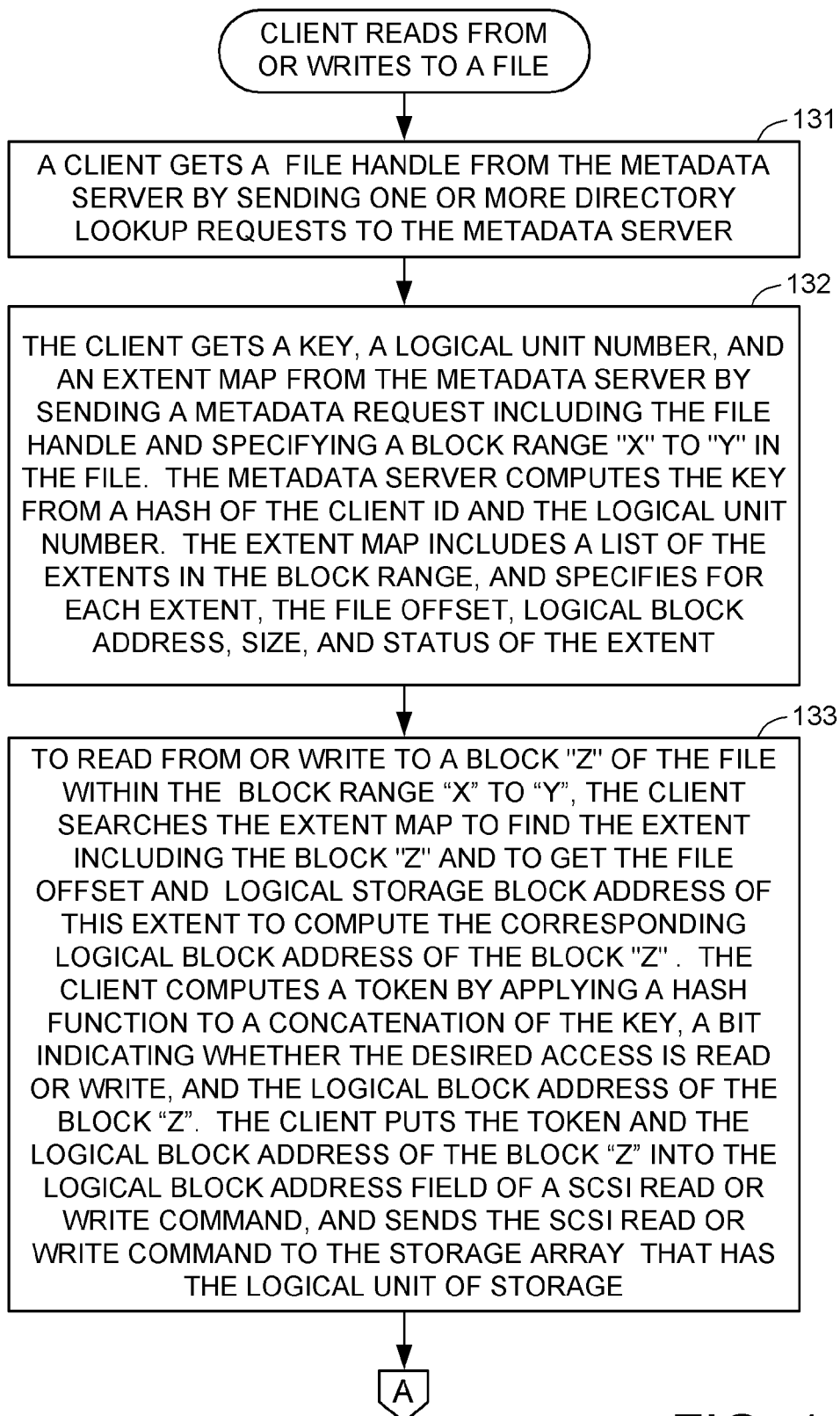

FIGS. 14 and 15 show a file access protocol used in the first embodiment of FIG. 6. In a first step 131 of FIG. 14, a client gets a file handle from the metadata server by sending one or more directory lookup requests to the metadata server. In step 132, the client gets a key, a logical unit number, and an extent map from the metadata server by sending a metadata request including the file handle and specifying a block range "X" to "Y" in the file.

In step 133, to read from or write to a block "Z" of the file within the block range "X" to "Y", the client searches the extent map to find the extent including the block "Z" and to get the file offset and logical block address of this extent in order to compute the corresponding logical block address of the block "Z". The client computes a token by applying a hash function to a concatenation of the key, a bit indicating whether the desired access is read or write, and the logical block address of the block "Z". The client puts the token and the logical block address of the block "Z" into the logical block address field of a SCSI read or write command, and sends the SCSI read or write command to the storage array that has the storage of the logical unit number. Execution continues to step 134 of FIG. 15.

In step 134 of FIG. 15, the storage array receives the SCSI read or write command and obtains the token and the logical block address from the logical block address field of the SCSI read or write command. The storage array re-computes the key from a hash of the client ID and the logical unit number, and the storage array re-computes the token from a hash of this key, a bit indicating whether the SCSI command is a read or write command, and the logical block address. The storage array compares the re-computed token to the token obtained from the logical block address field of the SCSI command, and if the tokens are equal, then the storage array allows read or write access to the storage of the logical unit at the logical block address from the logical block address field of the SCSI read or write command. Otherwise, if the tokens are not equal, the storage array denies access and returns an error code to the client.

In step 135, for additional security, the storage array may maintain a list of clients that are permitted at any given time to access each logical unit stored by the storage array, and check this list upon receipt of each SCSI read or write command to deny read or write access to a logical unit by a client that is not on this list. The access control lists for some of the logical units could be configured to indicate that the logical units are "private" to respective clients. The access control lists for logical units shared among the clients could be modified dynamically as certain clients obtain locks upon extents in the logical units. For example, when the metadata server grants a lock to a client upon file data in a logical unit and the client holds no other locks on the logical unit, the metadata server sends to the storage array an "add client to LUN access control list" request including the client ID and the logical unit number, and when a client's lock is released and the client holds no other locks on the logical unit, the metadata server sends to the storage array a "remove client from LUN access control list" request including the client ID and the logical unit number.

Figure 16:
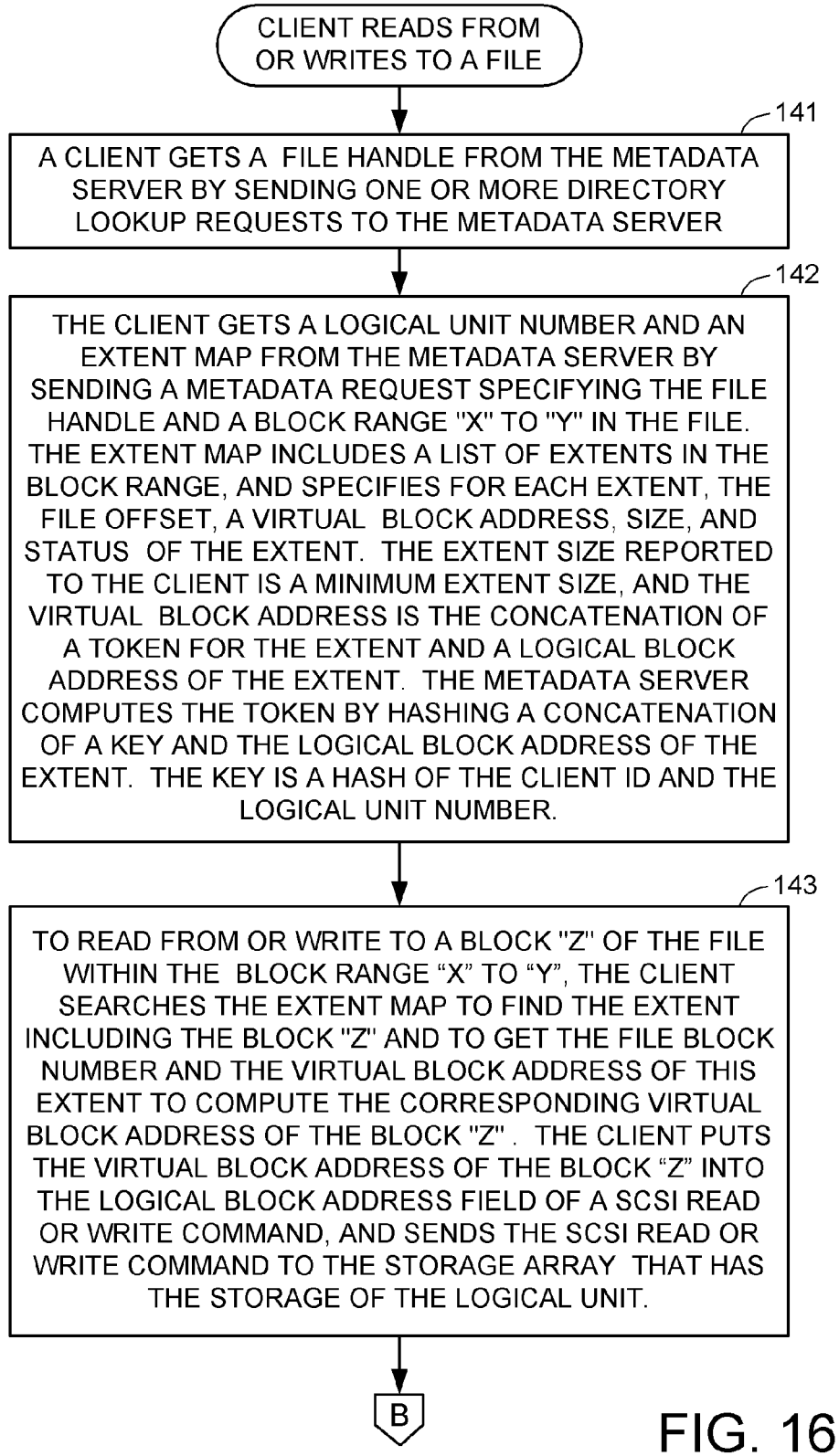

FIGS. 16 and 17 show a file access protocol used in the second embodiment of FIG. 7. In a first step 141 of FIG. 16, a client gets a file handle from the metadata server by sending one or more directory lookup requests to the metadata server. In step 142, the client gets a logical unit number and an extent map from the metadata server by sending a metadata request specifying the file handle and a block range "X" to "Y" in the file. The extent map includes a list of extents in the block range, and specifies for each extent, the file offset, a virtual block address of the extent, a size of the extent, and a status of the extent. The extent size reported to the client is a minimum extent size, and the virtual storage block address is the concatenation of a token for the extent and a logical block address of the extent. The metadata server computes the token by hashing a concatenation of a key and the logical block address of the extent. The key is a hash of the client ID and the logical unit number.

In step 143, to read from or write to a block "Z" of the file within the block range "X" to "Y", the client searches the extent map to find the extent including the block "Z" and to get the file offset and the virtual block address of this extent to compute the corresponding virtual block address of the block "Z". The client puts the virtual block address of the block "Z" into the logical block address field of a SCSI read or write command, and sends the SCSI read or write command to the storage array that has the storage of the logical unit number. Execution continues from step 143 to step 144 in FIG. 17.

In step 144 of FIG. 17, the storage array receives the SCSI read or write command and obtains the token and the extent LBA and offset in the extent from the logical block address field of the SCSI read or write command. The storage array re-computes the key from a hash of the client ID and the logical unit number, and re-computes the token from a hash of the re-computed key and the extent LBA. The storage array compares the re-computed token to the token obtained from the logical block address field of the SCSI command, and if the tokens are equal, then the storage array allows read or write access to the storage of the logical unit at the logical block address in bytes 6 to 9 of the logical block address field of the SCSI read or write command. Otherwise, if the tokens are not equal, the storage array denies access and returns an error code to the client.

Figure 18:
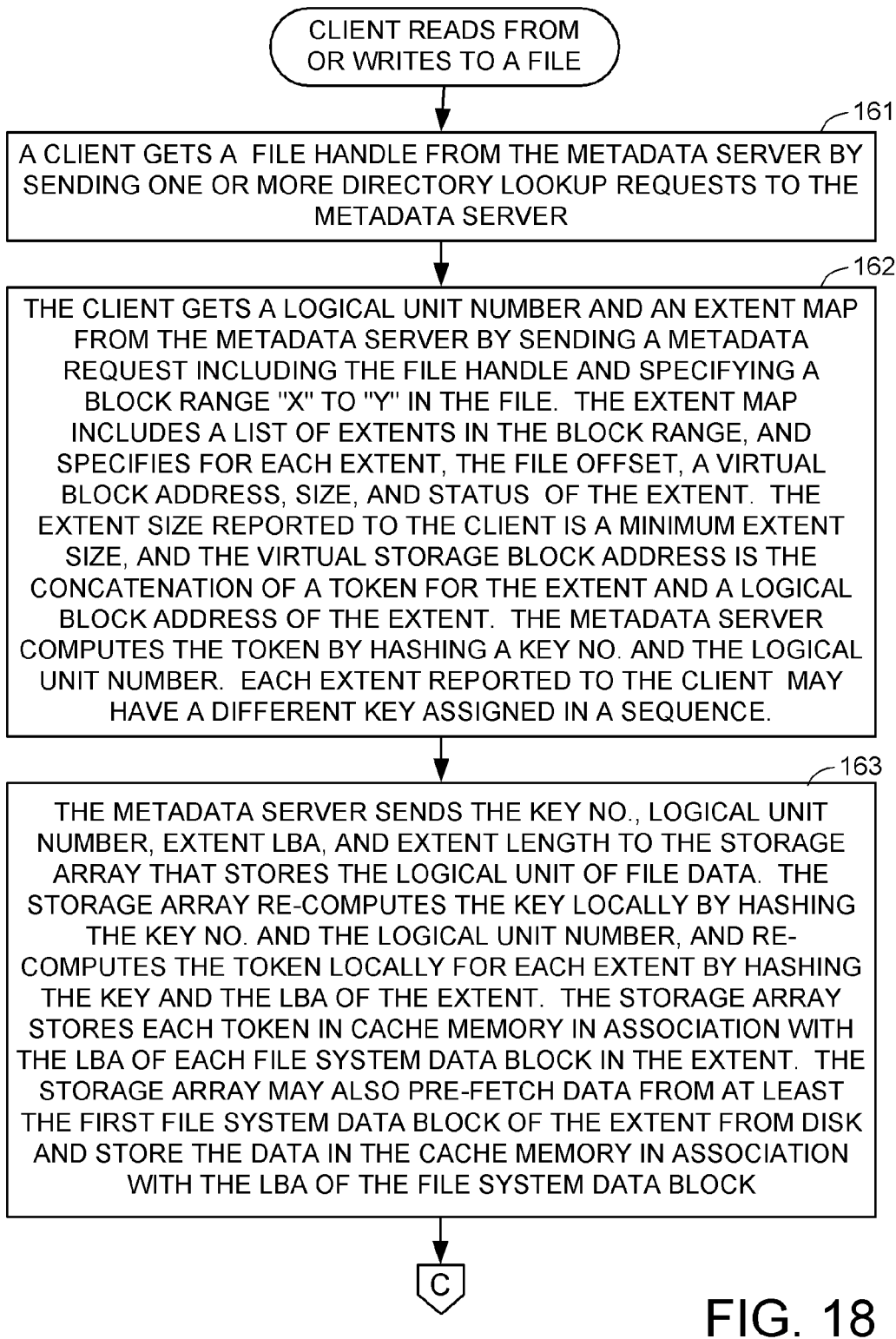
Figure 19:
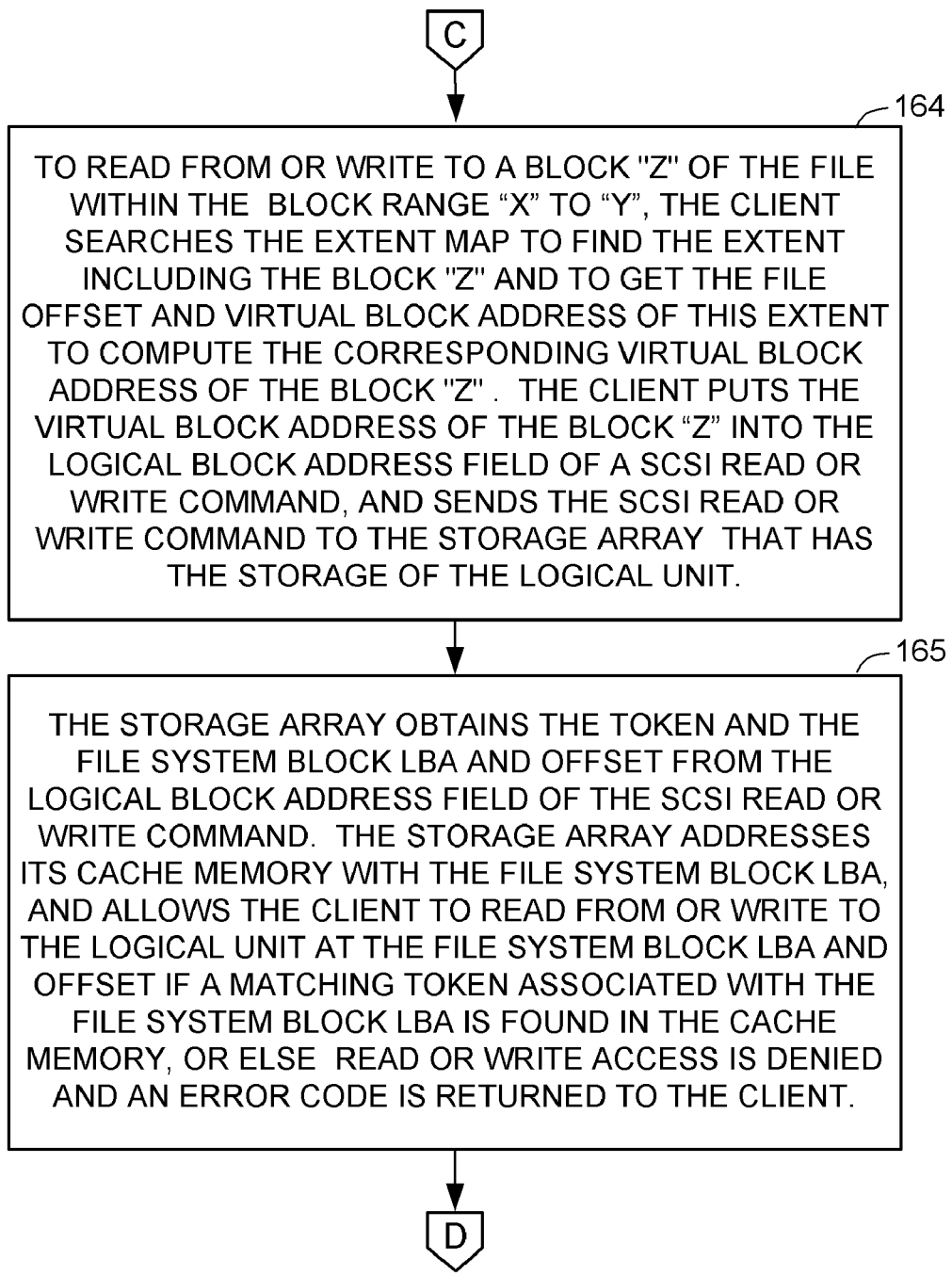

FIGS. 18 to 20 show the file access protocol used in the third embodiment of FIG. 8. In a first step 161 of FIG. 18, the client gets a file handle from the metadata server by sending one or more directory lookup requests to the metadata server. In step 162, the client gets a logical unit number and an extent map from the metadata server by sending a metadata request including the file handle and specifying a block range "X" to "Y" in the file. The extent map includes a list of extents in the block range, and specifies, for each extent, the file offset, a virtual block address of the extent, the size of the extent, and the status of the extent. The metadata server reports to the client a minimum extent size, so that for each file extent having more than the minimum extent size, the metadata server includes in the extent map multiple extents of the minimum extent size. For each extent in the extent map, the metadata server includes a virtual storage block address that is the concatenation of a token for the extent and a logical block address of the extent. The metadata server computes the token by hashing a key number and the logical unit number. Each extent reported to the client may have a different key assigned in a sequence.

In step 163, the metadata server sends the key number, logical unit number, extent LBA, and extent length to the storage array storing the logical unit of file data. The storage array re-computes the key locally by hashing the key number and the logical unit number, and re-computes the token locally for each extent by hashing the key and the LBA of the extent. The storage array stores each token in cache memory in association with the LBA of each file system data block of the extent. The storage array may also pre-fetch data from at least the first file system data block of the extent from disk and store the data in the cache memory in association with the LBA of the file system data block. Execution continues from step 163 in FIG. 18 to step 164 in FIG. 19.

In step 164 of FIG. 19, to read or write to a block "Z" of the file within the block range "X" to "Y", the client searches the extent map to find the extent including the block "Z" and to get the file offset and the virtual block address of this extent to compute the corresponding virtual block address of the block "Z". The client puts the virtual block address of the block "Z" into the logical block address field of a SCSI read or write command, and sends the SCSI read or write command to the storage array that has the storage of the logical unit.

In step 165, the storage array obtains the token and the file system block LBA and offset from the logical block address field of the SCSI read or write command. The storage array addresses its cache memory with the file system block LBA, and allows the client to read from or write to the logical unit at the file system block LBA and offset if a matching token associated with the file system block LBA is found in the cache memory. Otherwise, if the storage array does not find a matching token associated with the file system block LBA in its cache memory, then the storage array denies read or write access and returns an error code to the client. Execution continues from step 165 in FIG. 19 to step 166 in FIG. 20.

In step 166 of FIG. 20, the metadata server may revoke access to a file extent by sending a "revoke key" command to the storage array. The "revoke key" command includes the key number, logical unit number, extent LBA, and extent length. The storage array re-computes the key locally by hashing the key number and the logical unit number, and re-computes the token locally for each file system data block in the extent by hashing the key and the LBA of the file system data block. For each file system data block in the extent, the storage array removes from the cache memory the token associated with the LBA of the file system data block.

Figure 21:
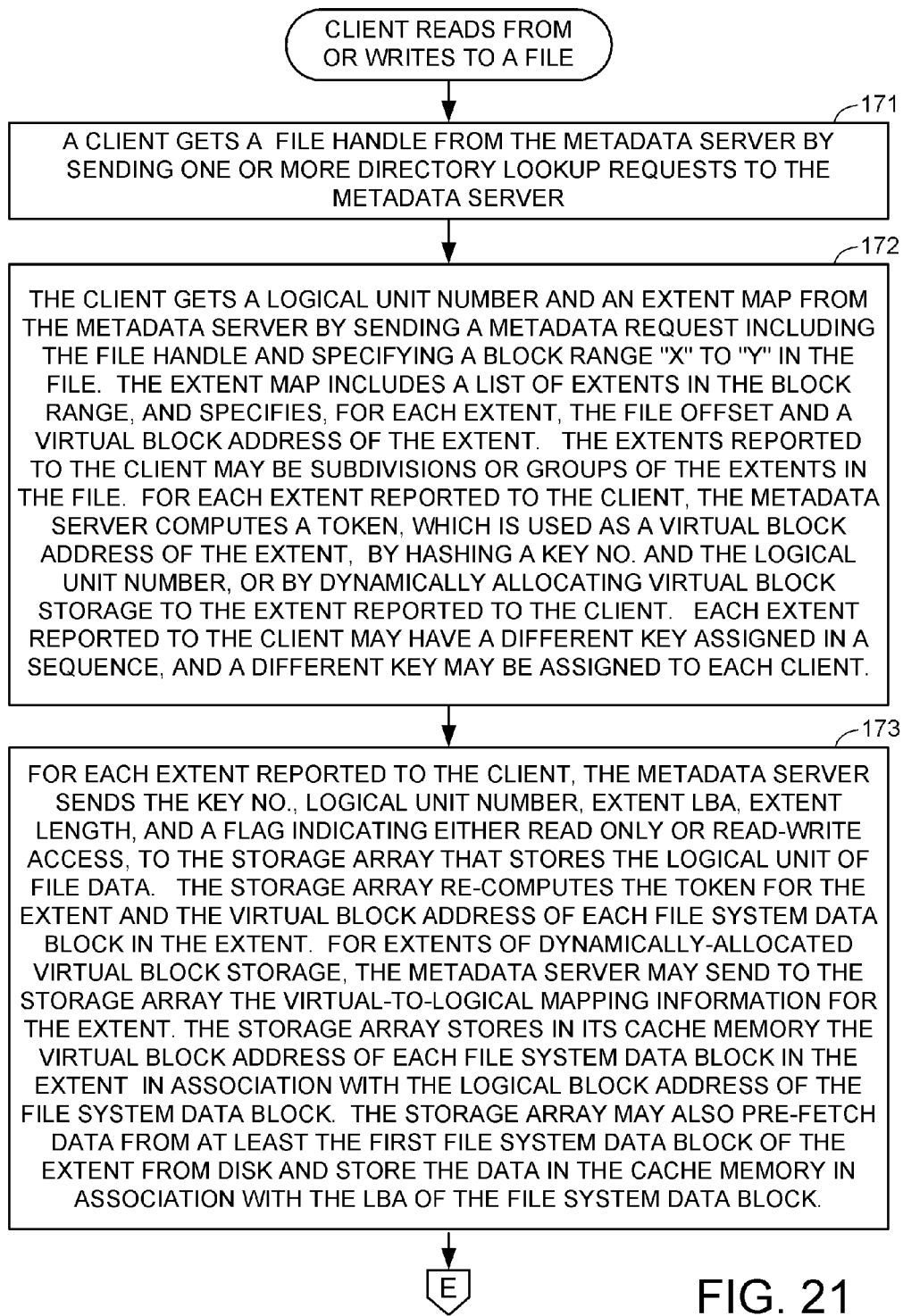
FIGS. 21 to 23 together comprise a flowchart of the file access protocol used in the fourth embodiment of FIG. 9.
Figure 22:
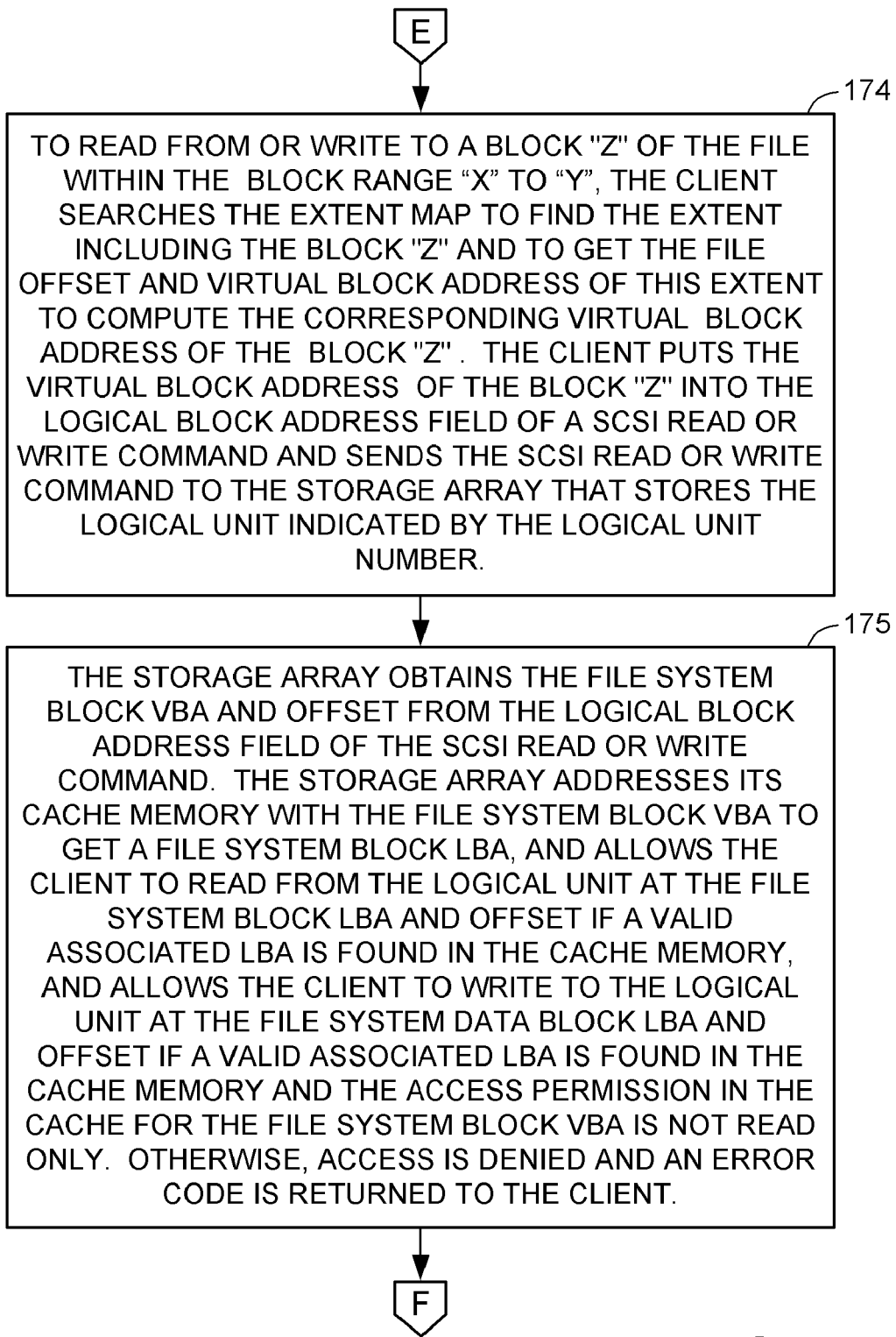
Figure 23:
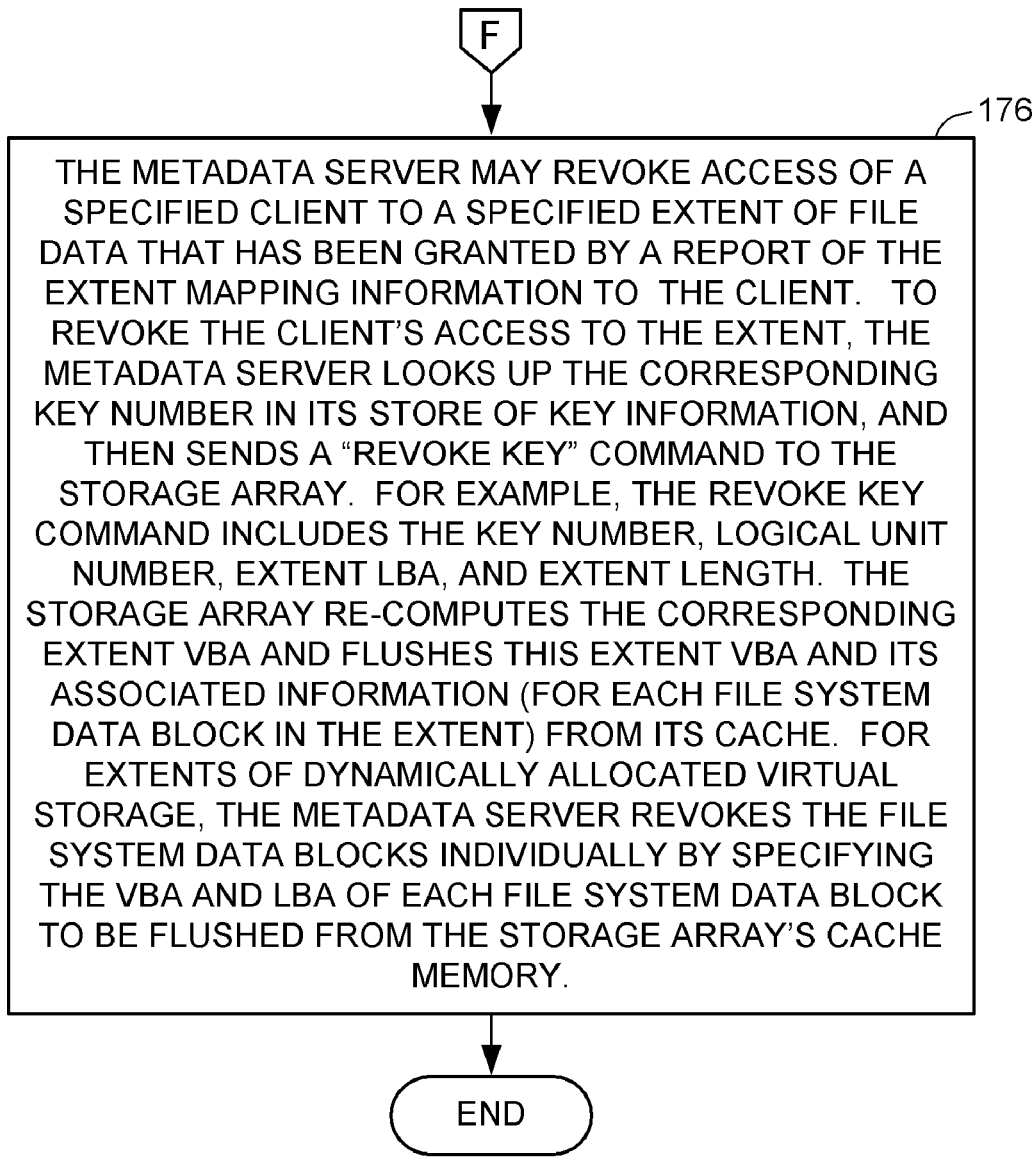

FIGS. 21 to 23 together comprise a flowchart of the file access protocol used in the fourth embodiment of FIG. 9. In a first step 171 of FIG. 21, a client gets a file handle from the metadata server by sending one or more directory lookup requests to the metadata server. In step 172, the client gets a logical unit number and an extent map from the metadata server by sending a metadata request including the file handle and specifying a block range "X" to "Y" in the file. The extent map includes a list of extents in the block range, and specifies, for each extent, the file offset, a virtual block address of the extent, the size of the extent, and the status of the extent. The extents reported to the client may be subdivisions or groups of the extents in the file. For each extent reported to the client, the metadata server computes a token, which is used as a virtual block address of the extent, by hashing a key number and a logical unit number. By hashing a key number and a logical unit number, each extent reported to the client may have a different key assigned in a sequence, and a different key may be assigned to each client. Alternatively, the extent reported to the client is dynamically allocated from virtual block storage, so that the virtual block address of the extent is dynamically assigned to the extent and to the client.

In step 173, for each extent reported to the client, the metadata server sends the key number, logical unit number, extent LBA, extent length, and a flag indicating either read-only or read-write access to the storage array storing the logical unit of file data. The storage array re-computes the token for the extent, which is the virtual block address of the extent. The virtual block address of the extent is the virtual block address of the first file system data block in the extent. For an extent length greater than one file system block, the storage array computes the virtual block address of each of the other file system data blocks in the extent by sequentially incrementing the virtual block address of the extent. For extents of dynamically allocated virtual block storage, the metadata server may send to the storage array the virtual block address of each file system data block in association with the logical block address of the file system data block. The storage array stores in its cache memory the virtual block address of each file system data block in the extent in association with the LBA of the file system data block. The storage array may also pre-fetch data from at least the first file system data block of the extent from disk and store the data in the cache memory in association with the LBA of the file system data block. Execution continues from step 173 of FIG. 21 to step 174 of FIG. 22.

In step 174 of FIG. 22, to read from or write to a block "Z" of the file within the block range of "X" to "Y", the client searches the extent map to find the extent including the block "Z" and to get the file offset and virtual block address of this extent to compute the corresponding virtual block address of the block "Z". The client puts the virtual block address of the block "Z" into the logical block address field of a SCSI read or write command and sends the read or write command to the storage array that stores the logical unit indicated by the logical unit number.

In step 175, the storage array obtains the file system block VBA and offset from the logical block address field of the SCSI read or write command. The storage array addresses its cache memory with the file system block VBA to get the associated file system block LBA, and allows the client to read from the logical unit at the file system block LBA and offset if a valid associated LBA is found in the cache memory and allows the client to write to the logical unit at the file system block LBA and offset if a valid associated LBA is found in the cache memory and the access permission in the cache for the file system block VBA is not read only. Otherwise, the storage array denies read or write access and returns an error code to the client. Execution continues from step 175 to step 176 in FIG. 23.

In step 176 in FIG. 23, the metadata server may revoke access of a specified client to a specified extent of file data that has been granted by a report of the extent mapping information to the client. To revoke the client's access to the extent, the metadata server looks up the corresponding key number in its store of key information, and then sends a "revoke key" command to the storage array. The revoke key command, for example, includes the key number, logical unit number, extent LBA, and extent length. The storage array re-computes the corresponding extent VBA and flushes this extent VBA and its associated information (for each file system data block in the extent) from its cache. For extents of dynamically allocated virtual storage, the metadata server revokes the file system data blocks by sending to the storage array a "revoke key" command specifying the VBA and LBA of each file system data block to be flushed from the storage array's cache memory.

In view of the above, for enhanced access control, a client includes a token in each read or write command to a block storage device. The block storage device evaluates the token in the read or write command to determine whether or not the token permits the client to read from or write to storage at a logical block address specified by the read or write command. So that no change is required in the industry-standard SCSI protocol, the token is included in the logical block address field of the SCSI read or write command. In this case, the client accesses a virtual block address space for the block storage. To avoid any change in the metadata server, the client may compute the token as a function of the logical block address of a data block to be accessed. To avoid any change in the client, a metadata server may include the token in each block address of each extent reported to the client in response to a metadata request. For enhanced security, the token also is a function of an identifier of the client, the number of the logical unit of storage to be accessed, and access rights of the client to a particular extent of file system data blocks.

The invention claimed is:

1. In a data processing network including a client, a metadata server, and a block storage device, the metadata server managing metadata of a shared-disk file system, and the block storage device storing file data of the shared-disk file system, a method of securing read or write access of the client to the block storage device, said method comprising:
the client sending a request to the metadata server for access to at least a portion of a file in the shared-disk file system, and the metadata server granting access of the client to said at least a portion of the file by returning to the client information specifying a token for validating read or write access to file data of said at least a portion of the file;
the client sending a read or write command for read or write access to storage of the block storage device, the read or write command including the token and specifying a logical block address; and
the block storage device receiving the read or write command from the client and evaluating the token to determine whether or not the token permits the client to read from or write to the storage at the specified logical block address, and the block storage device permitting the client to read from or write to the storage at the specified logical block address upon determining that the token permits the client to read from or write to the storage at the specified logical block address;
which further includes the metadata server forming a virtual block address for a range of contiguous logical block addresses, the virtual block address including the token, and the metadata server sending the virtual block address to the client upon granting the client access to said at least a portion of the file, and wherein the client inserts the virtual block address into at least a portion of an address field of the read-write command; and
which further includes the metadata server sending the token and a logical block address for said range of contiguous logical block addresses to the block storage device, and the block storage device storing the received token in a memory in association with the logical block address for said range of contiguous logical block addresses, and the block storage device using the virtual block address in the read or write command received from the client to perform a look-up in the memory in order to perform the evaluation of the token to determine whether or not the token permits the client to read from or write to the storage at the specified logical block address when a token is found in the memory in association with the logical block address for said range of contiguous logical block addresses and the token found in the memory in association with the logical block address for said range of contiguous logical block addresses is the same as the token in the virtual address.

2. The method as claimed in claim 1, which further includes storing file data of said range of contiguous logical block addresses in the memory in association with the logical block address for said range of contiguous logical block addresses, and wherein the evaluation of the token to determine whether or not the token permits the client to read from or write to the storage at the specified logical block address is performed in parallel with a look-up in the memory for the file data of said range of contiguous logical block addresses.

3. A system comprising:
a client;
a metadata server managing metadata of a shared-disk file system; and
a block storage device storing file data of the shared-disk file system;
wherein the client is programmed to send a request to the metadata server for access to at least a portion of a file in the shared-disk file system, and the metadata server is programmed to grant access of the client to said at least a portion of the file by returning to the client information specifying a token for validating read or write access to file data of said at least a portion of the file; and
the metadata server is programmed to form a virtual block address for a range of contiguous logical block addresses, the virtual block address including the token, and to send the virtual block address to the client upon granting the client access to said at least a portion of the file, and the client is programmed to insert the virtual block address into an address field of a Small Computer System Interface (SCSI) read or write command and to send the Small Computer System Interface (SCSI) read or write command to the block storage device; and
the metadata server is programmed to send the token and a logical block address for said range of contiguous logical block addresses to the block storage device, and
the block storage device includes:
data storage storing the file data of the shared-disk file system;
a network adapter coupled to the data storage for transfer of data between the client and the data storage; and
at least one data processor coupled to the data storage and the network adapter for control of transfer of data between the network adapter and the data storage;
wherein said at least one data processor is programmed to receive the Small Computer System Interface (SCSI) read or write command from the client, and to evaluate the virtual block address in the block address field of the Small Computer System Interface (SCSI) read or write command from the client to determine whether or not the virtual block address in the block address field is a valid virtual block address, and upon determining that the virtual block address in the block address field is not a valid virtual block address, to deny the client read or write access to the data storage, and otherwise, upon determining that the virtual block address in the block address field is a valid virtual block address, to produce a logical block address from the valid virtual block address and to permit the client to read from or write to the data storage at the logical block address produced from the valid virtual block address; and
wherein the block storage device further includes a cache memory storing tokens from the metadata server in association with logical block addresses from the metadata server, and wherein said at least one data processor is further programmed to evaluate the virtual block address in the block address field by obtaining a token from a first group of bits in the block address field, obtaining a logical block address from a second group of bits in the block address field, accessing the cache memory to determine whether the cache memory contains the token in association with the logical block address from the second group of bits in the block address field to determine that the block address in the block address field is not a valid virtual block address when the token is not found in the cache memory in association with the logical block address from the second group of bits in the block address field, and otherwise to determine that the block address in the block address field is a valid virtual block address when the token is found in the cache memory in association with the logical block address from the second group of bits in the block address field.

* * * * *